(12) United States Patent
Wahrmund et al.

(10) Patent No.: US 10,139,507 B2
(45) Date of Patent: Nov. 27, 2018

(54) SEISMIC STRATIGRAPHIC SURFACE CLASSIFICATION

(71) Applicants: Leslie A. Wahrmund, Kingwood, TX (US); Antonio R. C. Paiva, Branchburg, NJ (US); Sara E. Hanson-Hedgecock, Houston, TX (US)

(72) Inventors: Leslie A. Wahrmund, Kingwood, TX (US); Antonio R. C. Paiva, Branchburg, NJ (US); Sara E. Hanson-Hedgecock, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 266 days.

(21) Appl. No.: 15/011,135

(22) Filed: Jan. 29, 2016

(65) Prior Publication Data
US 2016/0313463 A1    Oct. 27, 2016

Related U.S. Application Data

(60) Provisional application No. 62/152,453, filed on Apr. 24, 2015.

(51) Int. Cl.
*G01V 9/00* (2006.01)
*G01V 1/28* (2006.01)
(Continued)

(52) U.S. Cl.
CPC .................. *G01V 1/28* (2013.01); *G01V 1/30* (2013.01); *G01V 1/301* (2013.01); *G01V 99/00* (2013.01);
(Continued)

(58) Field of Classification Search
CPC .......... G01V 1/28; G01V 99/00; G01V 1/301; G01V 1/30; G01V 2210/64; G06N 99/005
See application file for complete search history.

(56) References Cited

U.S. PATENT DOCUMENTS

| 4,916,615 A | 4/1990 | Chittimeni |
| 4,992,995 A | 2/1991 | Favret |
| (Continued) | | |

FOREIGN PATENT DOCUMENTS

| WO | 99/64896 | 12/1999 |
| WO | 2005/017564 | 2/2005 |
| (Continued) | | |

OTHER PUBLICATIONS

Borgos, H.G., et al. (2005) "Automated Structural Interpretation Through Classification of Seismic Horizons", *Mathematical Methods and Modelling in Hydrocarbon Exploration and Production*, pp. 89-106.
(Continued)

*Primary Examiner* — Kyoung Lee
(74) *Attorney, Agent, or Firm* — ExxonMobil Upstream Research Company—Law Department

(57) ABSTRACT

A method to classify one or more seismic surfaces or surface patches based on measurements from seismic data, including: obtaining, by a computer, a training set including a plurality of previously obtained and labeled seismic surfaces or surface patches and one or more training seismic attributes measured or calculated at, above, and/or below the seismic surfaces; obtaining, by the computer, one or more unclassified seismic surfaces or surface patches and one or more seismic attributes measured or calculated at, above, and/or below the unclassified seismic surfaces; learning, by the computer, a classification model from the previously obtained and labeled seismic surfaces or surface patches and the one or more training seismic attributes; and classifying, by the computer, the unclassified seismic surfaces or surface patches based on a comparison between the classification model and the unclassified seismic surfaces or surface patches.

18 Claims, 13 Drawing Sheets

(51) Int. Cl.
  *G01V 1/30* (2006.01)
  *G01V 99/00* (2009.01)
  *G06N 99/00* (2010.01)
(52) U.S. Cl.
  CPC ....... *G06N 99/005* (2013.01); *G01V 2210/64* (2013.01)

(56) References Cited

U.S. PATENT DOCUMENTS

| | | |
|---|---|---|
| 5,047,991 A | 9/1991 | Hsu |
| 5,265,192 A | 11/1993 | McCormack |
| 5,274,714 A | 12/1993 | Hutcheson et al. |
| 5,416,750 A | 5/1995 | Doyen et al. |
| 5,444,619 A | 8/1995 | Hoskins et al. |
| 5,465,308 A | 11/1995 | Hutcherson et al. |
| 5,539,704 A | 7/1996 | Doyen et al. |
| 5,586,082 A | 12/1996 | Anderson et al. |
| 5,677,893 A | 10/1997 | de Hoop et al. |
| 5,852,588 A | 12/1998 | de Hoop et al. |
| 5,940,777 A | 8/1999 | Keskes |
| 6,052,650 A | 4/2000 | Assa et al. |
| 6,226,596 B1 | 5/2001 | Gao |
| 6,236,942 B1 | 5/2001 | Bush |
| 6,295,504 B1 | 9/2001 | Ye et al. |
| 6,363,327 B1 | 3/2002 | Wallet et al. |
| 6,411,903 B2 | 6/2002 | Bush |
| 6,438,493 B1 | 8/2002 | West et al. |
| 6,466,923 B1 | 10/2002 | Young |
| 6,473,696 B1 | 10/2002 | Onyia et al. |
| 6,526,353 B2 | 2/2003 | Wallet et al. |
| 6,560,540 B2 | 5/2003 | West et al. |
| 6,574,565 B1 | 6/2003 | Bush |
| 6,574,566 B2 | 6/2003 | Grismore et al. |
| 6,618,678 B1 | 9/2003 | Van Riel |
| 6,625,541 B1 | 9/2003 | Shenoy et al. |
| 6,725,163 B1 | 4/2004 | Trappe et al. |
| 6,735,526 B1 | 5/2004 | Meldahl et al. |
| 6,751,558 B2 | 6/2004 | Huffman et al. |
| 6,754,380 B1 | 6/2004 | Suzuki et al. |
| 6,754,589 B2 | 6/2004 | Bush |
| 6,757,614 B2 | 6/2004 | Pepper et al. |
| 6,771,800 B2 | 8/2004 | Keskes et al. |
| 6,801,858 B2 | 10/2004 | Nivlet et al. |
| 6,804,609 B1 | 10/2004 | Brumbaugh |
| 6,847,895 B2 | 1/2005 | Nivlet et al. |
| 6,882,997 B1 | 4/2005 | Zhang et al. |
| 6,941,228 B2 | 9/2005 | Toelle |
| 6,950,786 B1 | 9/2005 | Sonneland et al. |
| 6,957,146 B1 | 10/2005 | Taner et al. |
| 6,970,397 B2 | 11/2005 | Castagna et al. |
| 6,977,866 B2 | 12/2005 | Huffman et al. |
| 6,988,038 B2 | 1/2006 | Trappe et al. |
| 7,006,085 B1 | 2/2006 | Acosta et al. |
| 7,053,131 B2 | 5/2006 | Ko et al. |
| 7,092,824 B2 | 8/2006 | Favret et al. |
| 7,098,908 B2 | 8/2006 | Acosta et al. |
| 7,162,463 B1 | 1/2007 | Wentland et al. |
| 7,184,991 B1 | 2/2007 | Wentland et al. |
| 7,188,092 B2 | 3/2007 | Wentland et al. |
| 7,203,342 B2 | 4/2007 | Pedersen |
| 7,206,782 B1 | 4/2007 | Padgett |
| 7,222,023 B2 | 5/2007 | Laurenet et al. |
| 7,243,029 B2 | 7/2007 | Lichman et al. |
| 7,248,258 B2 | 7/2007 | Acosta et al. |
| 7,248,539 B2 | 7/2007 | Borgos et al. |
| 7,266,041 B1 | 9/2007 | Padgett |
| 7,295,706 B2 | 11/2007 | Wentland et al. |
| 7,295,930 B2 | 11/2007 | Dulac et al. |
| 7,308,139 B2 | 12/2007 | Wentland et al. |
| 7,453,766 B1 | 11/2008 | Padgett |
| 7,453,767 B1 | 11/2008 | Padgett |
| 7,463,552 B1 | 12/2008 | Padgett |
| 7,502,026 B2 | 3/2009 | Acosta et al. |
| 7,658,202 B2 | 2/2010 | Wiley et al. |
| 7,697,373 B1 | 4/2010 | Padgett |
| 7,881,501 B2 | 2/2011 | Pinnegar et al. |
| 8,010,294 B2 | 8/2011 | Dorn et al. |
| 8,027,517 B2 | 9/2011 | Gauthier et al. |
| 8,055,026 B2 | 11/2011 | Pedersen |
| 8,065,088 B2 | 11/2011 | Dorn et al. |
| 8,121,969 B2 | 2/2012 | Chan et al. |
| 8,128,030 B2 | 3/2012 | Dannenberg |
| 8,213,261 B2 | 7/2012 | Imhof et al. |
| 8,219,322 B2 | 7/2012 | Monsen et al. |
| 8,326,542 B2 | 12/2012 | Chevion et al. |
| 8,346,695 B2 | 1/2013 | Pepper et al. |
| 8,358,561 B2 | 1/2013 | Kelly et al. |
| 8,363,959 B2 | 1/2013 | Boiman et al. |
| 8,380,435 B2 | 2/2013 | Kumaran et al. |
| 8,385,603 B2 | 2/2013 | Beucher et al. |
| 8,447,524 B2 | 5/2013 | Chen et al. |
| 8,447,525 B2 | 5/2013 | Pepper et al. |
| 8,463,551 B2 | 6/2013 | Aarre |
| 8,515,678 B2 | 8/2013 | Pepper et al. |
| 8,625,885 B2 | 1/2014 | Brinson et al. |
| 8,792,301 B2 | 7/2014 | James |
| 8,803,878 B2 | 8/2014 | Andersen et al. |
| 8,843,353 B2 | 9/2014 | Posamentier et al. |
| 8,849,640 B2 | 9/2014 | Holl et al. |
| 9,122,956 B1 | 9/2015 | Fink |
| 2005/0137274 A1 | 6/2005 | Ko et al. |
| 2005/0171700 A1 | 8/2005 | Dean |
| 2005/0288863 A1 | 12/2005 | Workman |
| 2006/0115145 A1 | 6/2006 | Bishop |
| 2006/0184488 A1 | 8/2006 | Wentland |
| 2007/0067040 A1 | 3/2007 | Ferree |
| 2008/0123469 A1 | 5/2008 | Wibaux et al. |
| 2008/0212841 A1 | 9/2008 | Gauthier et al. |
| 2008/0270033 A1 | 10/2008 | Wiley et al. |
| 2010/0174489 A1 | 7/2010 | Bryant et al. |
| 2010/0211363 A1 | 8/2010 | Dorn et al. |
| 2010/0245347 A1 | 9/2010 | Dorn et al. |
| 2011/0307178 A1 | 12/2011 | Hoekstra |
| 2012/0072116 A1 | 3/2012 | Dorn et al. |
| 2012/0090001 A1 | 4/2012 | Yen |
| 2012/0117124 A1 | 5/2012 | Bruaset et al. |
| 2012/0150447 A1 | 6/2012 | Van Hoek et al. |
| 2012/0195165 A1 | 8/2012 | Vu et al. |
| 2012/0197530 A1 | 8/2012 | Posamentier et al. |
| 2012/0197531 A1 | 8/2012 | Posamentier et al. |
| 2012/0197532 A1 | 8/2012 | Posamentier et al. |
| 2012/0197613 A1 | 8/2012 | Vu et al. |
| 2012/0257796 A1 | 10/2012 | Henderson et al. |
| 2012/0322037 A1 | 12/2012 | Raglin |
| 2013/0006591 A1 | 1/2013 | Pyrcz et al. |
| 2013/0064040 A1 | 3/2013 | Imhof et al. |
| 2013/0080066 A1 | 3/2013 | Al-Dossary et al. |
| 2013/0138350 A1 | 5/2013 | Thachaparambil et al. |
| 2013/0158877 A1 | 6/2013 | Bakke et al. |
| 2013/0338927 A1 | 12/2013 | Kumaran |
| 2014/0081613 A1 | 3/2014 | Dinnusse et al. |
| 2014/0188769 A1 | 7/2014 | Lim et al. |
| 2015/0178631 A1 | 6/2015 | Thomas et al. |

FOREIGN PATENT DOCUMENTS

| | | |
|---|---|---|
| WO | 2012/090001 | 7/2012 |
| WO | 2013/048798 | 4/2013 |

OTHER PUBLICATIONS

Carrillat, A., et al. (2008) "Integrated Geological and Geophysical Analysis by Hierarchical Classification: Combining Seismic Stratigraphic and AVO Attributes", *Petroleum Geoscience*, vol. 14, No. 4, pp. 339-354.

Nguema, E.P. N., et al. (2008) "Model-based Classification With Dissimilarities: A Maximum Likelihood Approach", *Pattern Analysis and Applications*, vol. 11, No. 3-4, pp. 281-298.

Marroquin, I. D., et al. (2009) "A Visual Data-Mining Methodology for Seismic Facies Analysis: Part 1—Testing and Comparison With Other Unsupervised Clustering Methods", *Geophysics*, vol. 74, No. 1, p. 1-p. 11.

(56) References Cited

OTHER PUBLICATIONS

Abreu, V., (1998), "Geologic Evolution of Conjugate Volcanic Passive Margins: Pelotas Basin (Brazil) and Offshore Namibia (Africa); Implication For Global Sea-Level Changes", Rice University, Dept. of Earth Science, Houston, TX, Ph.D. Thesis, pp. 3-355.

Admasu, F., et al., (2004), "Automatic Method for Correlating Horizons Across Faults In 3D Seismic Data", IEEE Conference on Computer Vision and Pattern Recognition, 6 pgs.

Chopra, S., et al., (2008), "Emerging and Future Trends In Seismic Attributes", The Leading Edge, pp. 298-317.

Coward, M.P., et al., (1999), The Distribution of Petroleum Reserves In Basins ofTthe South Atlantic Margins, In: Cameron, N.R., Bate, R.H. and Clure, V.S. (eds) The Oil and Gas Habitats of The South Atlantic, Geological Society, London, Special Publications, vol. 153, pp. 101-131.

Davison, I., (1999), Tectonics and Hydrocarbon Distribution Along The Brazilian South Atlantic Margin, In: Cameron, N.R., Bate, R.H. and Clure, V.S. (eds) The Oil and Gas Habitats of The South Atlantic, Geological Society, London, Special Publications, vol. 153, pp. 133-151.

deGroot, P., et al., (2012), "Attributes Play Important Role In Seismic Interpretation", E&P, vol. 85, No. 10, pp. 31, 33-34.

Hart, B.S., (2013), "Whither Seismic Stratigraphy, Interpretation", Society of Exploration Geophysicists and American Association of Petroleum Geologists, vol. 1, No. 1, pp. SA3-SA20.

Monsen, et al., (2007), "Geologic-Process-Controlled Interpretation Based on 3D Wheeler Diagram Generation", SEG 2007, EAGE 69th Conference & Exhibition—London, UK, Jun. 11-14, 2007, 5 pages.

Mitchum, R.M., et al., (1977), "Seismic Stratigraphy and Global Changes of Sea Level, Part 6: Stratigraphic Interpretation of Seismic Reflection Patterns In Depositional Sequences, In C.E. Clayton, ed., Seismic Stratigraphy—Applications To hydrocarbon Exploration", Tulsa, OK, American Association of Petroleum Geologists Memoir 26, pp. 63-81.

Pal, N.R., et al., (2001), "Some Classification Algorithms Integrating Dempster-Shafer Theory of Evidence With The Rank Nearest Neighbor Rules", IEEE Transactions On Systems, Man and Cybernetics—Part A: Systems and Applications, vol. 31, No. 1, pp. 59-66.

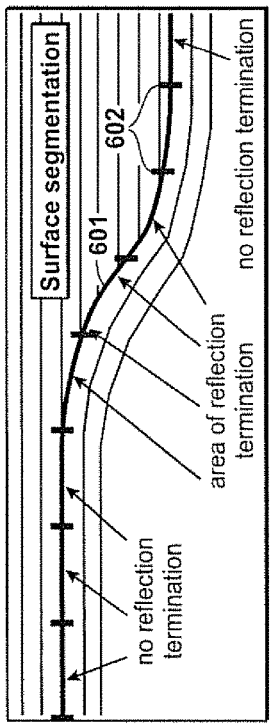
FIG. 6A
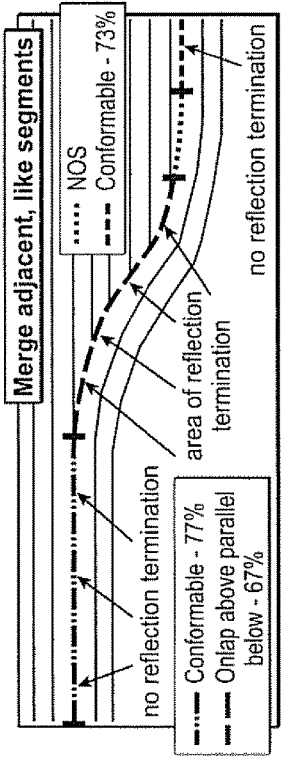
FIG. 6B
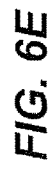
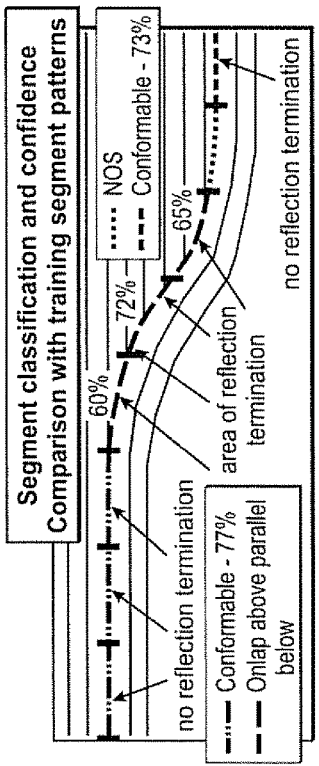
FIG. 6C
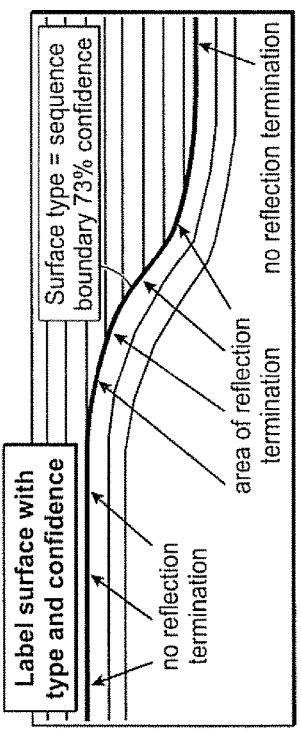
FIG. 6D
FIG. 6E

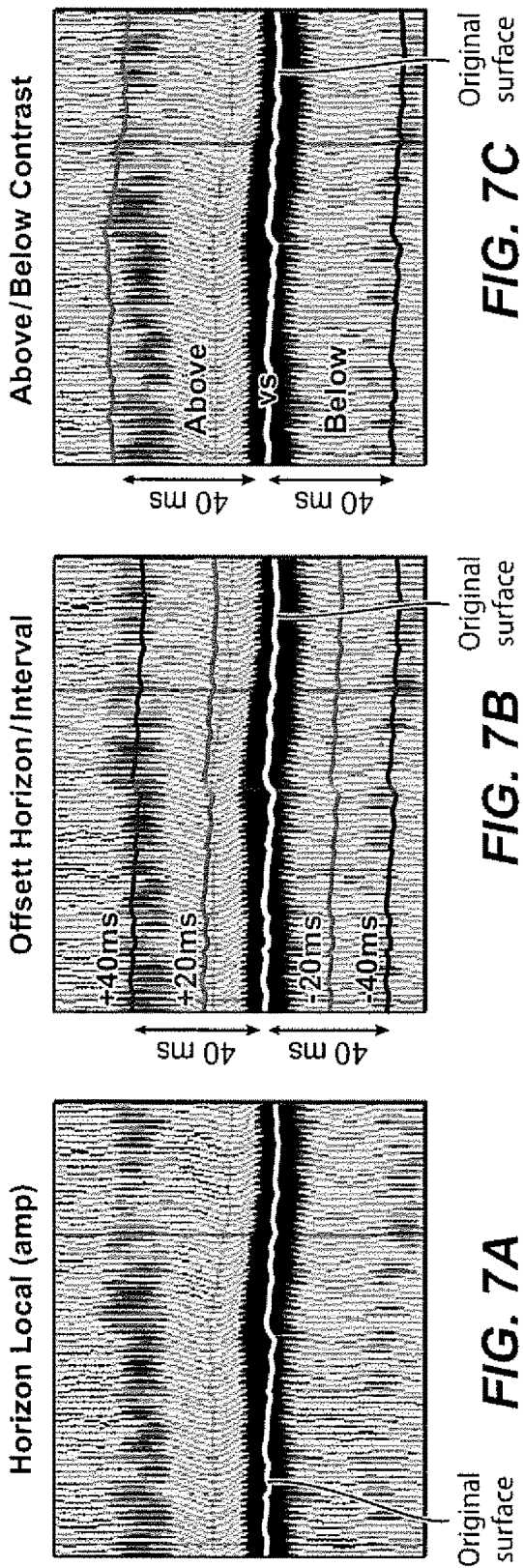

SEISMIC STRATIGRAPHIC SURFACE CLASSIFICATION

CROSS-REFERENCE TO RELATED APPLICATION

This application claims the benefit of U.S. Provisional Patent Application 62/152,453 filed Apr. 24, 2015 entitled SEISMIC STRATIGRAPHIC SURFACE CLASSIFICATION, the entirely of which is incorporated by reference herein.

FIELD OF THE INVENTION

The exemplary embodiments described herein relate generally to the field of geophysical prospecting, and more particularly to the analysis of seismic or other geophysical subsurface imaging data. Specifically, the disclosure describes a method to classify seismic surfaces or patches of seismic surfaces that have been previously obtained.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Seismic surfaces are horizons that have been tracked through 2D or 3D seismic data, which represent and generally follow subterranean reflector surfaces. They generally correspond to boundaries between layers of rock, with everything below the horizon older than everything above the surfaces, hence represent boundaries of equivalent time.

Since the 1970's, geoscientists have used the concepts of seismic stratigraphy to interpret and label the key types of seismic stratigraphic surfaces—sequence boundaries (SBs) and flooding surfaces (FSs). One fundamental concept of seismic stratigraphy is that sequence boundaries (SBs) and flooding surfaces (FSs) divide seismic data into chronological packages, forming boundaries of genetically related packages of strata called seismic sequences and seismic systems tracts. FIG. 1 is a schematic depositional sequence model illustrating unconformity 101, transgressive surfaces 102, depositional geometries, and key depositional packages including lowstand fan (potential reservoir) 103, lowstand wedge (potential seal) 104, and distal highstand (potential seal) 105. These surfaces types can be characterized and identified based on the geometry of surrounding seismic reflection terminations (onlap 201, downlap 202, toplap 203 and erosion or truncation 204) (FIG. 2), their own characteristics (e.g., amplitude, dip, smoothness or rugosity, continuity, etc.), and/or the characteristics of their bounding seismic facies (e.g., amplitude, frequency, continuity, geometry, seismic geomorphology, etc.). Application of these concepts has proven to be a robust technique to help predict qualitative and quantitative subsurface properties, including stratigraphic relationships, ages, environments of deposition, depositional facies, systems tracts, lithologies, porosities, and other rock properties, many of which are important in hydrocarbon exploration or development (Vail et al., 1977; Mitchum et al., 1977; Van Wagoner et al., 1988; Brown and Fischer, 1977; Neal and Abreu, 2009) (see FIG. 1).

Traditionally surfaces in seismic data have been tracked interactively along a 2D line or volume of seismic data. Computer-based surface picks were initially interpreted using drawing or tracking software. Subsequent innovations allow surfaces to be tracked automatically or semi-automatically through 2D or 3D seismic data nearly instantaneously using software now routinely available in numerous commercially available software products for geophysical interpretation (e.g., Viswanathan 1996 U.S. Pat. No. 5,570,106); Pedersen, 2002, GB Patent No. 2,375,448; Admasu and Toennies, 2004; James, WO 2007046107). With these methods, interpreted surfaces are based on one or more seed point(s) or seed track(s) provided by the interpreter, with the final interpretation interactively accepted or revised by the interpreter. Options or ambiguities in interpretation, such as which branch to take when a surface splits, are frequently resolved by application of seismic stratigraphic concepts by the seismic interpreter. One component of seismic interpretation, then, is the gradual development of a conceptual geologic or seismic stratigraphic framework model of the region represented by the seismic data. Part of this is implicit or explicit classification or labeling of surfaces as FSs, SBs, or other meaningful geologic or geophysical surface types by the interpreter as a guide to executing the interpretation and subsequent procedures. The interpreter does this based on the seismic reflection geometries and terminations (onlap, downlap, truncation and toplap), seismic characteristics of the surface itself (amplitude, dip, smoothness or rugosity, continuity, etc.), and seismic facies characteristics of the bounding intervals, following the concepts of seismic stratigraphy. Judgment and evaluation based on the developing conceptual geologic model is done at several points in the interpretation process, including selection of which surfaces to track, what choices to make when encountering ambiguities, deciding whether to accept or revise a surface, and selecting areas of interest for subsequent analyses, interpretation, or visualization, for example, as potential hydrocarbon reservoirs, source facies, or seal facies.

Further innovations in the interpretation of seismic surfaces now provide methods of automatic picking a dense set of surfaces, also known as "stacks of surfaces" or "global interpretation" in seismic volumes. These methods refer to interpretation of many or all surfaces, or portions of surfaces in seismic volumes. Geologically-motivated mathematical rules or user-guidance may be employed at decision points to resolve ambiguities, such as a faults or where reflectors merge or branch, and/or overlapping or crossing of surfaces. In some cases, sets of surface parts may be the final product. These extend over only portions of seismic volumes, often terminating where further correlation is ambiguous (i.e., "horizon patches" of Imhof et al., 2009). These sets of surfaces or surface parts can be produced relatively rapidly from 2D lines or 3D volumes of seismic data with little to no user interaction.

Examples of methods for automatically generating "stacks of surfaces" or "stacks of surface patches" that generally follow seismic events such as peaks, troughs, or zero crossings include:

- Li, Vasudevan and Cook (1997) describe a method called seismic skeletonization to automatically pick seismic events and assign attributes to each event. Events are correlated across neighboring traces so that changes in dip are minimized.
- U.S. Pat. No. 7,248,539 to Borgos ("Extrema Classification") (2007) discloses a method of automated interpretation of seismic reflectors and fault displacement calculations, based on classification of seismic waveforms along reflectors, specifically around extrema positions, where they gain improved performance in structurally complex regions.

Stark (U.S. Pat. No. 6,850,845B2)) describes a method for producing detailed seismic interpretation (and geologic time volumes or relative geologic time volumes) by applying phase unwrapping to instantaneous phase transform of a seismic volume.

Imhof et al., (2009) describe a method also called skeletonization for transforming a seismic volume to a large number of reflection-based surfaces that are topologically consistent, that is, having no self-overlaps, local consistency, and global consistency. A set of surfaces are created and labeled monotonically in a top-down fashion.

Pauget et al (WO 2010/067020 A2) describe a method to create a relative geologic age model by trace correlation which generates a global interpretation of seismic volumes. Software to apply their technology called Paleoscan is commercially available through a French company called Eliis.

deGroot and Qayyum (2012) describe a method to generate a dense set of surfaces throughout a 3D seismic volume based on applying a 3D auto tracking algorithm to a dip/azimuth field. This method is marketed as the "HorizonCube" of dGB Earth Sciences.

As described above, interactive seismic interpretation is nearly always done using a conceptual geologic model. The model is used to help select which surfaces to track, what choices to make when encountering ambiguities, whether to accept or revise a surface, and selection of areas of interest for subsequent analyses. When automatically generating stacks of surfaces or surface patches, such as occurs when applying the methods cited above, this step has not yet occurred. The output is a set of unclassified surfaces.

Surface Labeling

Other methods of surface clustering or labeling have been developed. These include: U.S. Pat. No. 6,771,800 ("Method of Chrono-Stratigraphic Interpretation of a Seismic Cross Section or Block") to Keskes et al. (2004) discloses a method to transform seismic data into the depositional or chronostratigraphic domain. They construct virtual reflectors, discretize the seismic section or volume, count the number of virtual reflectors in each pixel or voxel, and renormalize this histogram. By doing this procedure for every trace, they create a section or volume where each horizontal slice approximates a surface indicating a geologic layer deposited at one time. This can be used by an interpreter to determine sedimentation rates, highlighting geologic hiatuses, which are surfaces of non-deposition.

Monsen et al. ("Geologic-process-controlled interpretation based on 3D Wheeler diagram generation," SEG 2007) extended U.S. Pat. No. 7,248,539 to Borgos. They extract stratigraphic events from the seismic data and categorize them into over/under relationships based on local signal characteristics, deriving a relative order of patches using a topological sort. Flattened surfaces are then positioned in this relative order to allow a user to interpret the surface type by relative age, position, and basinward and landward extents, or through transformation to the depositional Wheeler domain (Wheeler, 1958). Wheeler methods can work in shelf margin depositional environments to determine surface types, but may not work in other settings, such as continental or deepwater. They also do not compute confidence measures.

SUMMARY

A method to classify one or more seismic surfaces or surface patches based on measurements from seismic data, including: obtaining, by a computer, a training set including a plurality of previously obtained and labeled seismic surfaces or surface patches and one or more training seismic attributes measured or calculated at, above, and/or below the seismic surfaces; obtaining, by the computer, one or more unclassified seismic surfaces or surface patches and one or more seismic attributes measured or calculated at, above, and/or below the unclassified seismic surfaces; learning, by the computer, a classification model from the previously obtained and labeled seismic surfaces or surface patches and the one or more training seismic attributes; and classifying, by the computer, the unclassified seismic surfaces or surface patches based on the application of the classification model to the unclassified seismic surfaces or surface patches.

The method can further include quantifying a degree of confidence in a classification of the unclassified seismic surfaces or surface patches.

In the method, the classifying can include labeling the unclassified seismic surfaces or surface patches with a label that differentiates between stratigraphic classes.

In the method, the labeling can include differentiating between sequence boundaries and flooding surfaces.

In the method, the classifying can use a relationship between surfaces to further differentiate flooding surfaces into maximum flooding surfaces or transgressive flooding surfaces.

In the method, the learning can include learning the classification model implicitly from the plurality of previously obtained and labeled seismic surfaces or surface patches and the one or more training seismic attributes.

In the method, the one or more seismic attributes can include a single measure of attribute contrast above and below a seismic surface or surface patch of the plurality of previously obtained and labeled seismic surfaces or surface patches in order to collapse stratigraphically diagnostic seismic facies information into a single boundary measure, and the classifying is based on the single measure of attribute contrast.

In the method, the classifying can include eliminating redundant attributes from amongst the one or more seismic attributes measured or calculated at, above, and/or below the unclassified seismic surfaces using a single-link hierarchical dendogram.

In the method, the classifying can be by hard assignment.
In the method, the classifying can be by soft assignment.
In the method, the classifying can include segmenting the one or more unclassified seismic surfaces or surface patches.
In the method, the classifying can include individually classifying segments of the one or more unclassified seismic surfaces or surface patches.
In the method, the segmenting can result in approximately equal segment sizes.
In the method, the segmenting can include using the one or more seismic attributes to determine segment size, wherein at least one segment has a different size than another segment.

The method can include differentiating between different flooding surfaces of the classification of the unclassified seismic surfaces or surface patches.

The method can include using the classification of the unclassified seismic surfaces or surface patches to manage the production of hydrocarbons.

In the method, the classification model can be learned in an incompletely labeled training dataset.

In the method, the classifying can include classifying surfaces above but not below AVO.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

FIGS. 6A, 6B, 6C, 6D, and 6E illustrate an example of the present technological advancement classifying an unlabeled surface.

FIGS. 7A, 7B, and 7C illustrate exemplary methods of extracting seismic attributes.

DETAILED DESCRIPTION

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Overview

Traditionally, sequence boundaries and flooding surfaces have been identified by human interpreters based on the seismic character above and/or below seismic reflections. The present technological advancement provides a method for automating the identification of flooding surfaces and sequence boundaries. An exemplary method described herein pertains to automatically classifying one or more seismic surfaces or surface patches which have been obtained from seismic data. These may be classified as flooding surfaces (FSs), sequence boundaries (SBs), or other surfaces of geologic or geophysical importance based on measurements from seismic data, such as surfaces above but not below AVO, and optionally compute confidence measures for the classification. The identification of surfaces and segments can be accomplished by referencing a training set of example segments and example surfaces. Different training sets may be used for different environments of deposition (EODs), basins, surveys, and/or different types of seismic data (zero-phase, quadrature, etc.).

An exemplary method can include (1) inputting the seismic surface(s) or surface patch(es), (2) inputting attributes measured from seismic data, (3) computing features at, above, and/or below the surface that characterize the surface and/or bounding facies, potentially using a measure of contrast, (4) classifying the surface, optionally quantifying the likelihood of the surface belonging to each type, and (5) outputting surface class and quantifying confidence. The surfaces can them be used for data analysis, interpretation, or visualization.

Figure 3A:
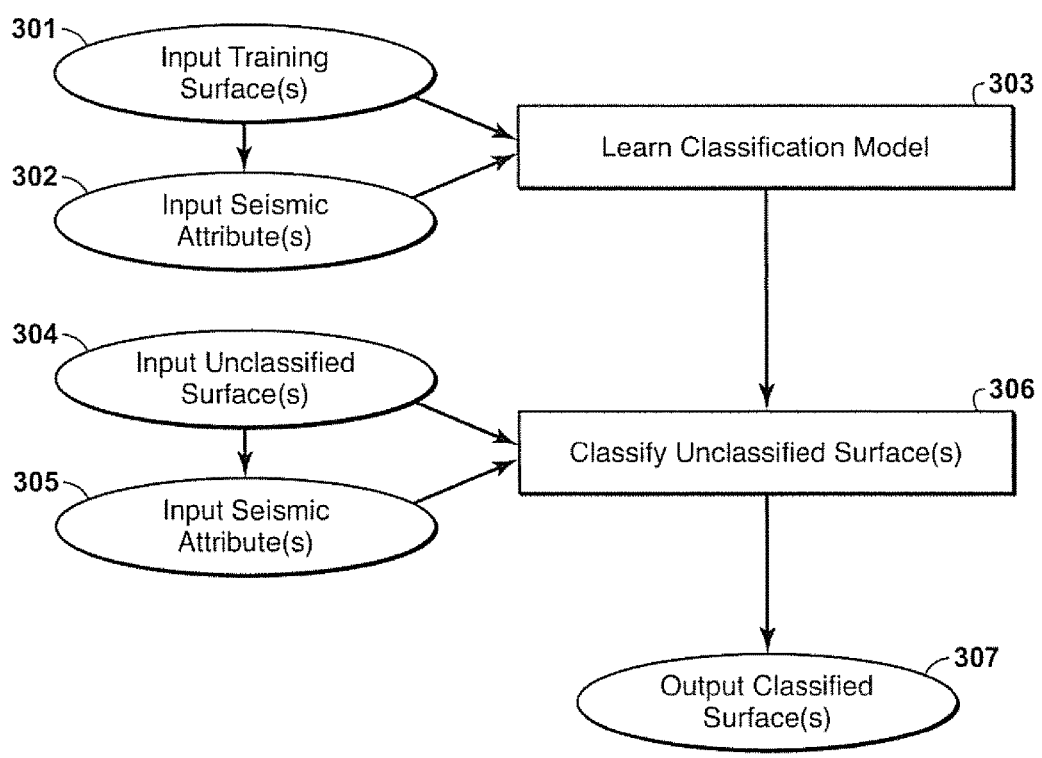
FIG. 3A illustrates an exemplary surface classification method.

FIG. 3A presents a flowchart for an exemplary embodiment of the present technological advancement. Step 301 includes inputting training surfaces, that is seismic surfaces previously picked and previously labeled, identified as SBs, FSs, or other surfaces of geologic or geophysical importance, such as surfaces above but not below AVO (amplitude vs offset). Step 302 includes inputting seismic attributes extracted at, above, and/or below those surfaces. While seismic attributes are further discussed below, some non-limiting examples include maximum amplitude within a 30 millisecond window, or minimum frequency within a 50 meter window. Step 303 includes learning a classification model. Step 304 includes inputting picked but unclassified surface(s). Step 305 includes extracting seismic attributes at, above, and/or below those surfaces. Step 306 includes classifying those unclassified surfaces, and optionally computing confidences, based on the previous training. Step 307 includes outputting the classified surface types and optionally computed confidences.

The classified surfaces and the optional confidences can be used to explore for or manage hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 3B:
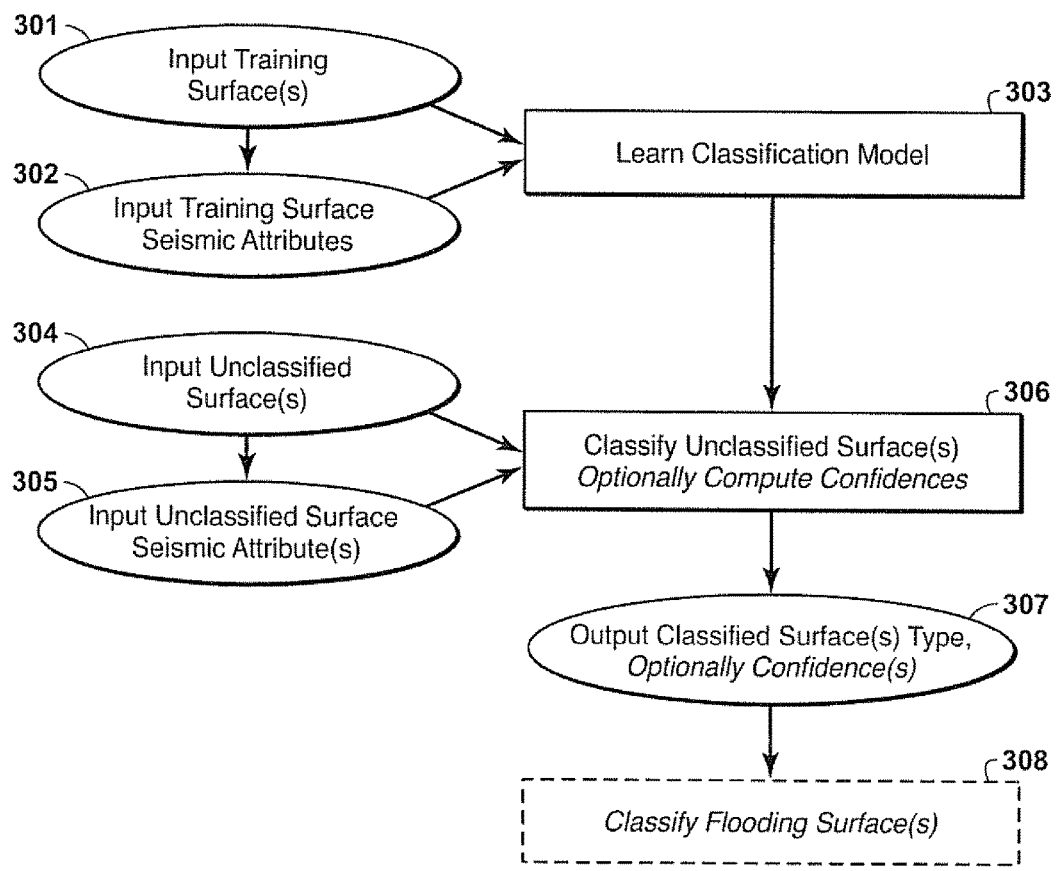
FIG. 3B illustrates an exemplary surface classification method.

Optionally, as shown in FIG. 3B, step 308 includes differentiating maximum flooding surfaces (MFSs) and/or transgressive flooding surfaces (TFSs) from sets of flooding surfaces identified between sequences.

Figure 1:
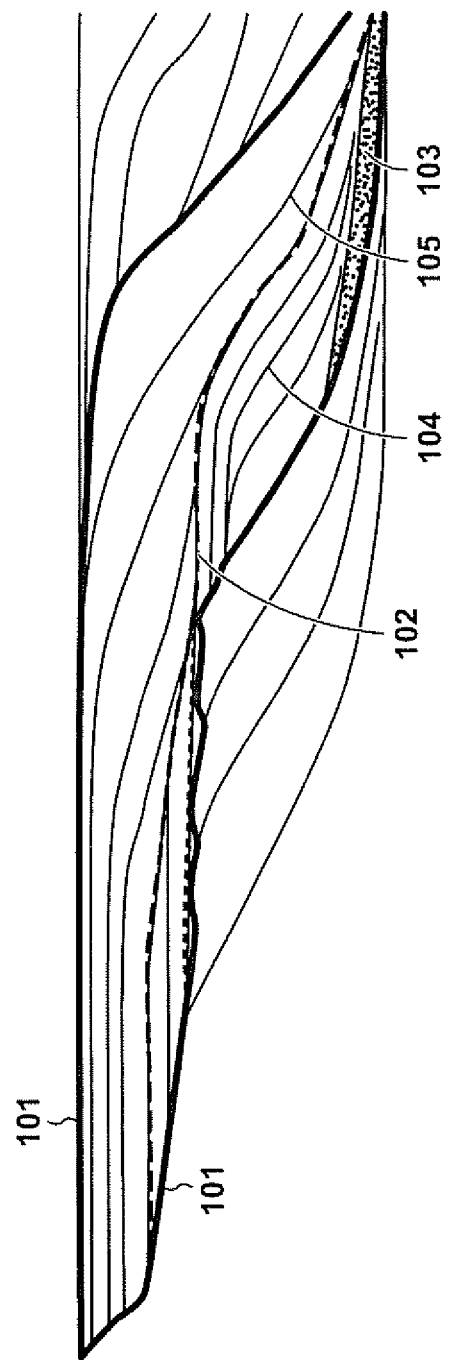
FIG. 1 is a schematic depositional sequence model.
Figure 4:
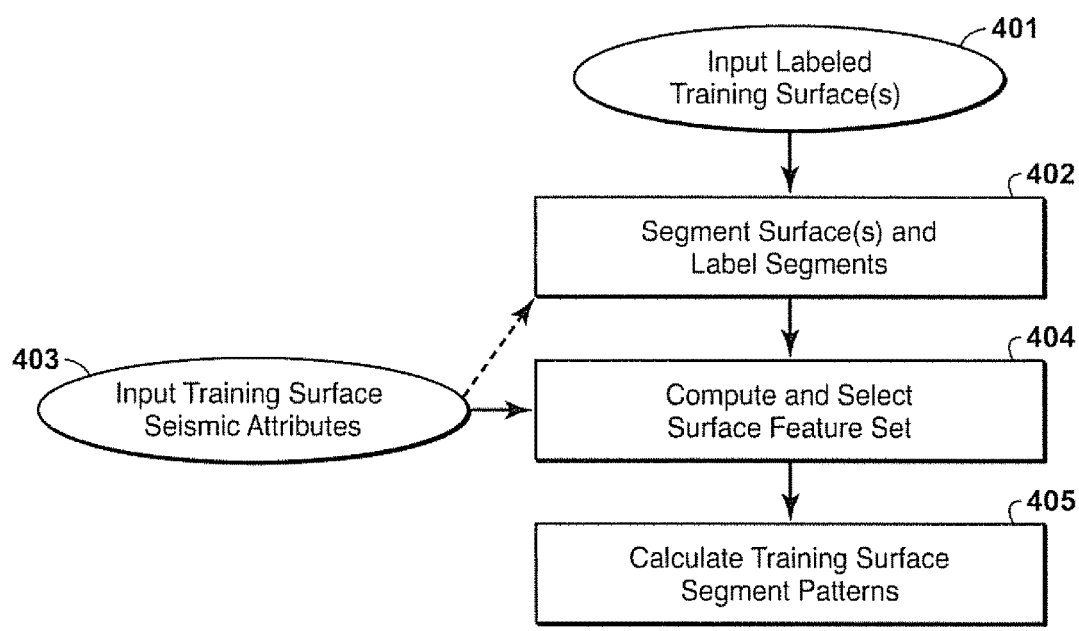
FIG. 4 illustrates an exemplary method for learning a classification model.

FIG. 4 shows the steps that can be used to learn the classification model (FIGS. 3A & B, step 303). In step 401, an expert interpreter identifies training surfaces and labels. These could be FSs and SBs, or other surfaces of geologic or geophysical interest in seismic data, such as surfaces above and not below AVO, or above onlapping stratigraphic packages such as lowstand fans (see FIG. 1). Step 402 includes segmenting the training surfaces. The training surfaces can be divided into equal or approximately equal segments, or even regarded as one segment. One segment may be appropriate for small surfaces or surface patches. Optionally, as indicated by the dashed line in FIG. 4, the segmenting can be based on the input attributes measured from the seismic data at, above, and/or below the training surfaces in step 403. The seismic data attributes can suggest that segment size be adjusted in order to reduce the number of adjacent segments that correspond to the same attribute. In step 404, features are calculated based on the input seismic attributes and a feature set is selected, optionally using cross-validation. Feature and attribute, conceptually, refer to the same thing. However, the transition to different nomenclature reflects a transition between different technical disciplines. The geoscientist refers to attributes, whereas feature is the statistical term. In machine learning and statistics, feature selection, also known as variable selection, attribute selection or variable subset selection, is the process of selecting a subset of relevant features for use in model construction. The central assumption when using a feature selection technique is that the data contains many redundant or irrelevant features. Redundant features are those which provide no more information than the currently selected features, and irrelevant features provide no useful information in any context.

The selected set of surface features can be a subset of the input training surface seismic attributes. As discussed below, a subset may be determined in order to reduce redundancy and improve efficiency. In step 405, segment patterns for each surface type are calculated and learn classification model from the training surface segment patterns.

Note that the set of training surfaces may be incompletely labeled; that is, the user may not have specified classification labels for all of the input training surfaces. This data can then be used to learn the classification model within a semi-supervised or active learning framework, as opposed to the more common supervised learning framework which requires completely labeled training sets. Semi-supervised learning takes advantage of the inherent structure in labeled and unlabeled training data to learn classifiers. In other words, the structure between labeled and unlabeled data is used to bootstrap and improve on a classifier learned using only the labeled training surfaces. Semi-supervised learning methods include self-training, co-training, and semi-supervised support vector machines; see X. Zhu, "Semi-Supervised Learning Literature Survey", Computer Science Technical Report TR 150, University of Wisconsin-Madison, 2008, for an overview. Active learning uses a common classifier method but it tries to improve the information in the labeled training by querying the user for the label of selected unlabeled surfaces. The main goal of active learning is to achieve the same or higher classification accuracy with fewer overall labeled training examples by the fact that is can choose which training examples are labeled. Burr Settles provides in "Active Learning Literature Survey", Computer Sciences Technical Report 1648, University of Wisconsin-Madison, 2010, a survey of active learning approaches. Ultimately, and regardless of the situation, the steps described in FIG. 4 are applied in the same way, the only difference is that in the case of an incompletely labeled training dataset the learning of the classification model in step 405 would involve an appropriate semi-supervised learning or active learning method.

Figure 5:
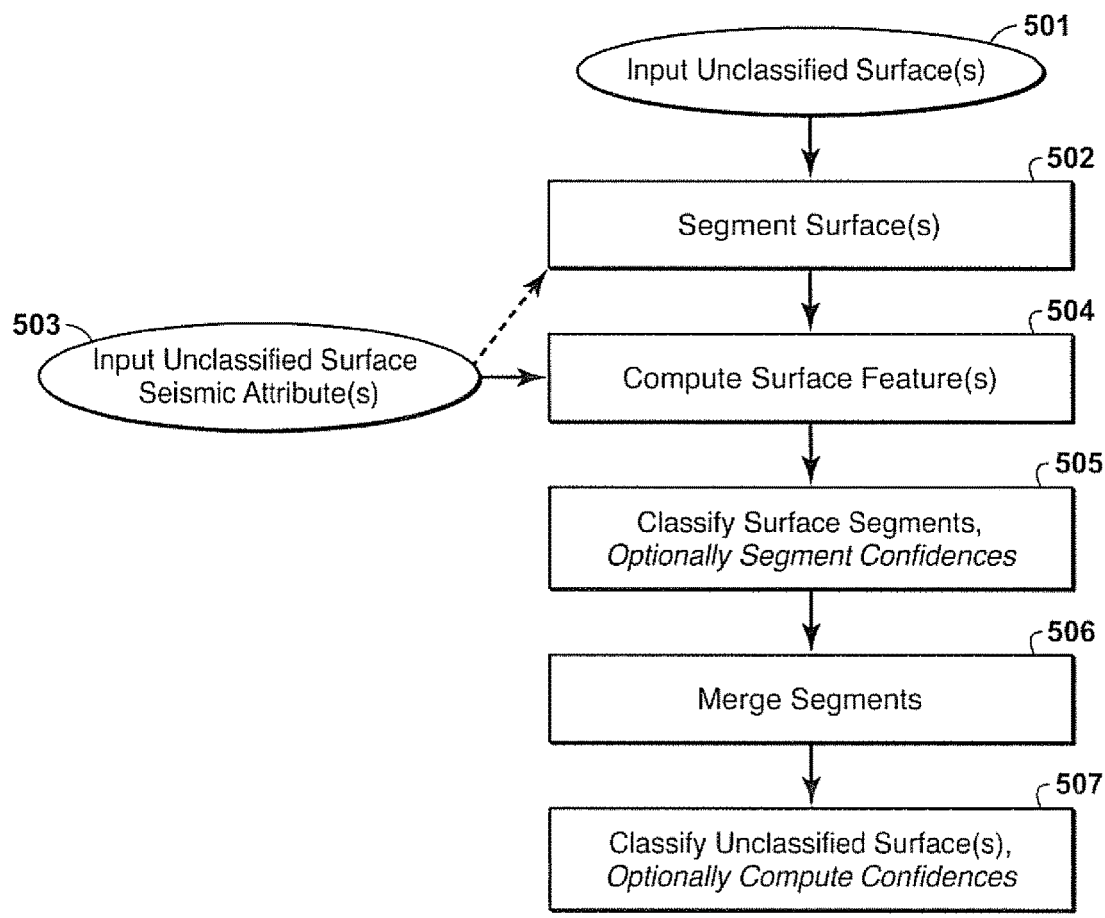
FIG. 5 illustrates an exemplary method for classifying picked unclassified surfaces.

FIG. 5 shows the steps that can be used in classifying unclassified surface(s) and optionally computing confidences, which corresponds to step 306 in FIGS. 3A and B. Step 501 includes inputting picked but unclassified seismic surface(s) or surface patch(es). Step 502 includes segmenting the surfaces, optionally utilizing seismic attributes in the segmentation. Step 503 includes inputting attributes measured from seismic data measured at, above, and/or below the unclassified surfaces. Step 504 includes computing features for the segments. Step 505 includes classifying the segments and quantifying confidences. Step 506 includes merging segments, generally based on adjacency and similarity. Step 507 includes classifying the surface and quantifying confidence based on segment patterns.

FIG. 6 is a graphical illustration of one application of the present technological advancement to classify an unlabeled surface. FIG. 6A shows an input unclassified interpreted surface 601 (FIG. 5 step 501). FIG. 6B shows segmenting the surface 601 into segments 602 (only one segment is labeled for clarity) (FIG. 5 step 502). FIG. 6C shows the first of two classifications—classifying the segments from 6B and computing confidences based on comparison with training segments (FIG. 5 step 505). FIG. 6D shows merging adjacent, like segments (FIG. 5 step 506). FIG. 6E shows the second classification—classifying the unclassified surface based on comparison with training surfaces and quantifying the confidence (FIG. 5 step 507).

Learning a Classification Model

FIGS. 3A and B describe the steps of a surface classification method. This method is based on learning a classification model from training surfaces that have been labeled by an interpreter. Accordingly, a user would provide the training surfaces and maybe some input attributes to use in classifying the surface. Alternatively, the process could be adapted to suggest additional attributes to input or automatically analyze the seismic data and derive additional attributes. If necessary, a feature selection step may be used to select a subset of the attributes such as to facilitate the learning of the classifier and improve the quality of the model learnt. These inputs are then used to learn a classification model to assign surfaces or patches to classes. The classification output can take the form of "hard" or "soft" assignment.

Soft assignment relates classes of objects with unsharp boundaries in which membership is a matter of degree. Those of ordinary skill are familiar with the application of probabilistic evaluation and fuzzy logic to classification or assignment problems and two common examples of soft assignment methodologies. Soft assignment is tolerant of imprecision, uncertainty, partial truth, and approximation. Hard assignment, on the contrary, does not account for any imprecision and would evaluate classification problems as a binary set (i.e., true/false).

FIG. 3A, step 301, includes inputting one or more training surfaces or surface patches that have been interpreted from 2D or 3D seismic surveys and labeled by an expert as a flooding surface (FS), sequence boundary (SB), or other surface of geologic or geophysical importance. These surfaces can be 2D or 3D seismic surfaces, and can be generated using any 2D or 3D interpretation method, such as manual interpretation, autopicking, grid picking and interpolation, etc. They can also be full 2D or 3D surfaces, or patches of 2D or 3D interpretation from full surfaces (surface patches). Different training sets will likely be required for different environments of deposition (EODs), basins, surveys, and/or different types of seismic data (zero-phase, quadrature, etc.). Generally larger, well-suited training sets are best.

FIG. 3A, step 302, includes inputting or extracting attributes measured from the seismic data. For example, in classical seismic stratigraphy, SBs and FSs are identified based on stratigraphic terminations, morphologies, continuity, facies, and/or other seismic characteristics at, above, or below the seismic surface. SBs are generally recognized by truncation or toplap termination-types below the surface, and/or onlap or conformable reflections above the surface. They can also be characterized by variable amplitude, conformable, and/or wavy to curved geometry at the surface.

Figure 2:
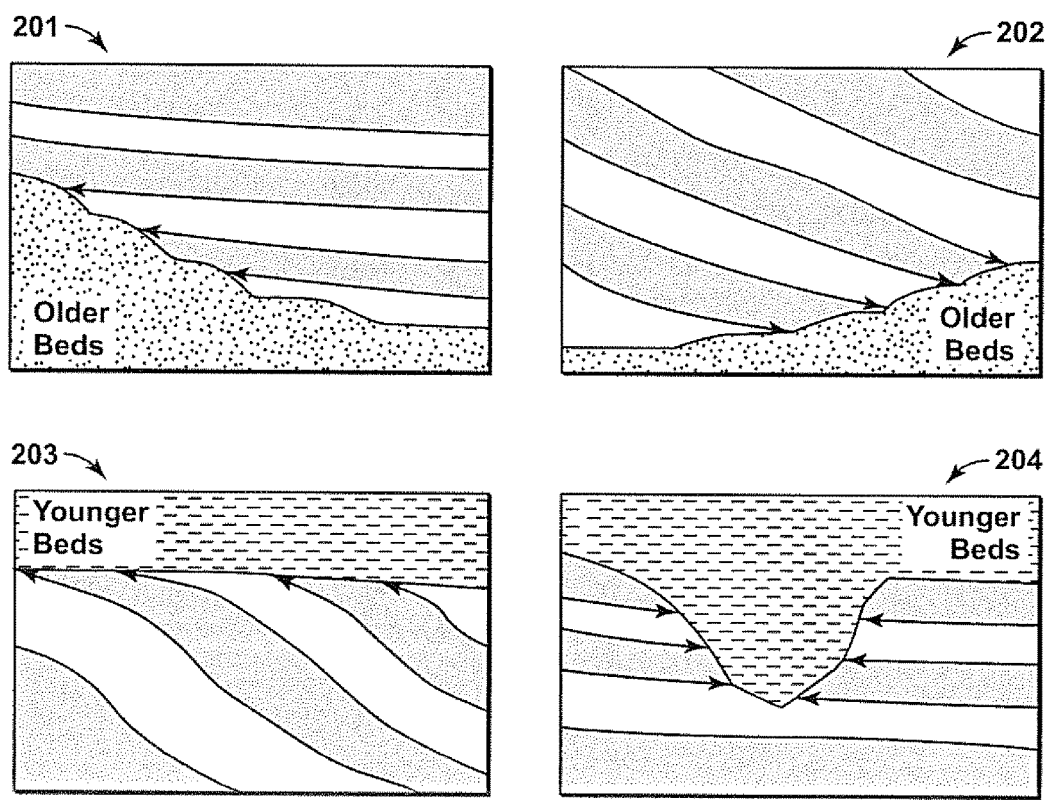
FIG. 2 illustrates seismic stratigraphic termination relationships.

FSs are generally more conformable and continuous than SBs and can be recognized by downlap onto the surface (FIGS. 1 and 2) (Vail et al., 1977; Mitchum et al., 1977).

Measurements from the seismic data, such as amplitude, dip, frequency, phase, or polarity, often called seismic attributes, are input to the classification. A seismic attribute is a quantity extracted or derived from seismic data that can be analyzed in order to enhance information that might be more subtle in a traditional seismic image. As illustrated in FIG. 7, these attributes can be measured at one location, such as at the seismic surface or a set distance above or below the seismic surface (FIG. 7A), or measured over a windowed interval above, below, or encompassing a seismic surface (FIG. 7B). They can be measured over a single seismic trace or a set of traces, from one or even multiple seismic volumes simultaneously. Attribute extraction from volumetric transforms based on dip, phase, frequency, variance, or other transforms from processed data can be useful. There is a wide variety of seismic attributes that have been developed over the last several decades, with a "virtual explosion in the last several years" (Chopra and Marfurt, 2008). Specialized attributes, including those that get at the seismic stratigraphic geometries and terminations, can be useful, but not necessarily required. Examples of these attributes include attributes related to spectral decomposition, which can highlight stratal thinning and thickening, seismic geomorphology, coherence, and/or discontinuity, curvature, dip and azimuth, as summarized in Chopra and Marfurt (2008); the thinning, unconformity and seismic facies attributes of Gesbert et al. (2009; CA2764705A1); and the terminations, stratigraphic angle and convergence, and phase residual attributes of Imhof et al (2011, WO2011/149609 A1). Another type of specialized seismic attribute, seismic facies classification or seismic facies texture, can also or alternatively be used. Seismic facies classification is a well-established technique for differentiating geologic or geophysical packages in seismic data, including facies, systems tracts, salt, gas chimneys, etc., based on amplitude, phase, frequency or other seismic attributes. Both supervised and unsupervised clustering approaches are used. Examples include waveform classification, texture mapping, seismic geomorphology classification, (see West et al., 2002; summary by Chopra and Marfurt, 2008). The present technological advancement differs from previous analyses in that it uses characteristics of the data to classify bounding surfaces or surface patches, not the surrounding facies. In this way, classified seismic facies can be used as input attributes for the classification.

Attributes from above and below a surface can also be combined into a single measurement of contrast across a surface (FIG. 7C). Walther's Law states that lateral migration of depositional environments over time creates vertical successions of depositionally adjacent facies belts. Because SBs and FSs represent where there is a disruption in Walther's Law, that is, where there are gaps in the normal vertical succession, they can often be recognized in places by contrasts in seismic amplitude, dip, or facies above and below. Above/below surface contrast is a novel method to collapse stratigraphically diagnostic seismic facies information into a single boundary measure. It can be calculated over above and below single offset values, or intervals (FIG. 7), using any type or transform of seismic data (amplitude, dip, chaos, etc.), single or sets of traces, from one or multiple seismic volumes.

There are numerous methods to calculate above/below surface contrast. Two methods that could be used are the Euclidean distance, $$d = \sqrt{\frac{1}{n}\left(\sum_{k=1}^{n}(x_k^A - x_k^B)^2\right)},$$

$$d = \sqrt{\left(\sum_{k=1}^{n}(x_k^A - x_k^B)^2\right)/n},$$

or normalized similarity, $$d = \frac{\sum_{k=1}^{n} x_k^A x_k^B}{\sqrt{\left(\sum_{k=1}^{n}(x_k^A)^2\right)\left(\sum_{k=1}^{n}(x_k^B)^2\right)}}$$

$$d = \frac{\sum_{k=1}^{n} x_k^A x_k^B}{\sqrt{\sum_{k=1}^{n}(x_k^A)^2 \sum_{k=1}^{n}(x_k^B)^2}},$$

where $x^A x^A$ and $x^B x^B$ are vectors with values extracted from one or more attributes, or computed statistics thereof, within a window or interval above and below, respectively, of the surface for which the surface contrast measure is being evaluated, and kk denotes the kkth element of the vector.

The "above/below surface contrast" is a quantification of how much some characteristic(s) differs above versus below the surface. The Euclidean distance gives you a measure for the contrast because it tells how much two vectors ($x^A$ and $x^B$) differ $x_k^A x_k^B$.

Because hundreds to thousands of attributes could be extracted from numerous positions and intervals (i.e., FIG. 7), expert selection of attributes most likely to be useful in identifying termination and facies characteristics and contrasts is preferred. Attributes that emphasize contrasts in amplitude (i.e., max/min/average amplitude above vs below horizon), dip (i.e., max/min/average dip above vs below horizon), frequency (i.e., max/min/average frequency above vs below horizon), chaos (i.e., max/min/average chaos above vs below horizon), and other characteristics, those that highlight thinning, pinchouts, and/or terminations (or the lack thereof), above and/or below horizons, and those that highlight surface position, extent, continuity, and curvature, are likely to have the highest correlations.

The next step, FIG. 3A step 303, is learning a classification model. As shown in FIG. 4, this step can include several sub-steps. First, as shown in FIG. 4, step 401, the training surfaces are interpreted and labeled by an expert as FSs, SBs, or other. For purposes of this document, labeled will refer to actions by a human, and classify will refer to actions by a computer programmed according to the present technological advancement.

Figure 8:
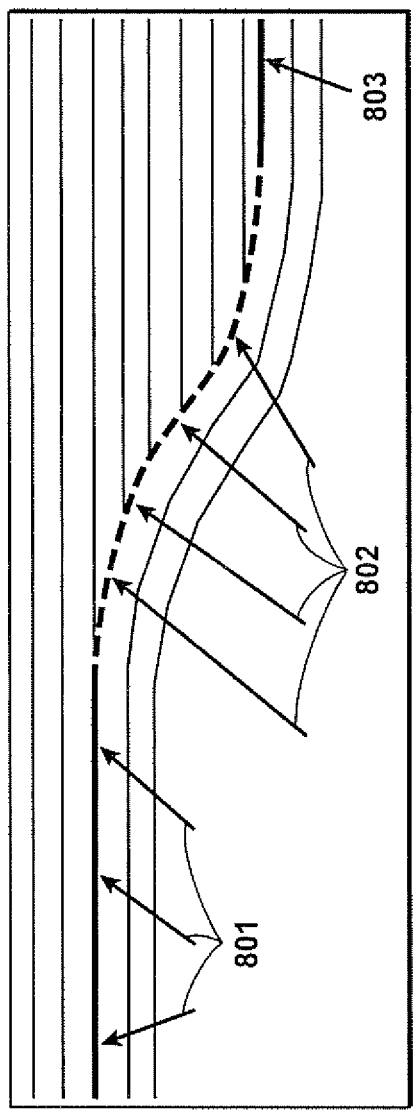
FIG. 8 is an example of a surface segmentation.

Next, as shown in FIG. 4, step 402, the surfaces are segmented and the segments are labeled. The surface segments could be equal sizes, or they could be clustered based on the input seismic attributes. The expert will define geologically diagnostic segments for each surface type (FSs and SBs), and label those segments by seismic termination type(s) or other characteristics. For example, in FIG. 8, the interpreter could identify Segment 801 as conformable above and below, with no reflection terminations, Segment 802 as onlap above and parallel below, and Segment 803 as conformable above and below. Different experts could segment the surfaces differently, say as "splitters or lumpers". These differences will then be reflected in different feature sets, and different segment patterns for surface classes; these differences will, in most circumstances, allow for different training sets with different interpreters. With increased experience with the system, the segmentation for particular datasets, data types, and/or depositional environments could be improved. In some instances, such as aerially small datasets, or datasets over which there is little change, little to no segmentation may be required. In some cases, such as small, 2D seismic datasets, training surfaces can be manually segmented. In others, such as larger 2D and 3D seismic datasets, seismic attributes measured at, above, and/or below the surfaces may be used to help segment the training surfaces. Though there is flexibility in the number of segment types that can be defined, no more than 5-15 types is recommended to minimize complexity. The same segment type labels should be used where multiple interpreters are labeling segments. Labels can be built based on above/below geometric pairs such as conformable/conformable, onlaping/toplapping, downlapping/conformable, onlaping/truncating, above/below seismic facies pairs such as high amplitude continuous/low amplitude semi-continuous, and/or surface characteristics such as the amplitude, continuity or curvature of the surface. Segment classes can be eliminated, merged, or increased based on preliminary classifier results.

Table 1 shows example segment labels for a SB, TFS, and MFS, and the segment patterns for several surfaces.

Figure 9:
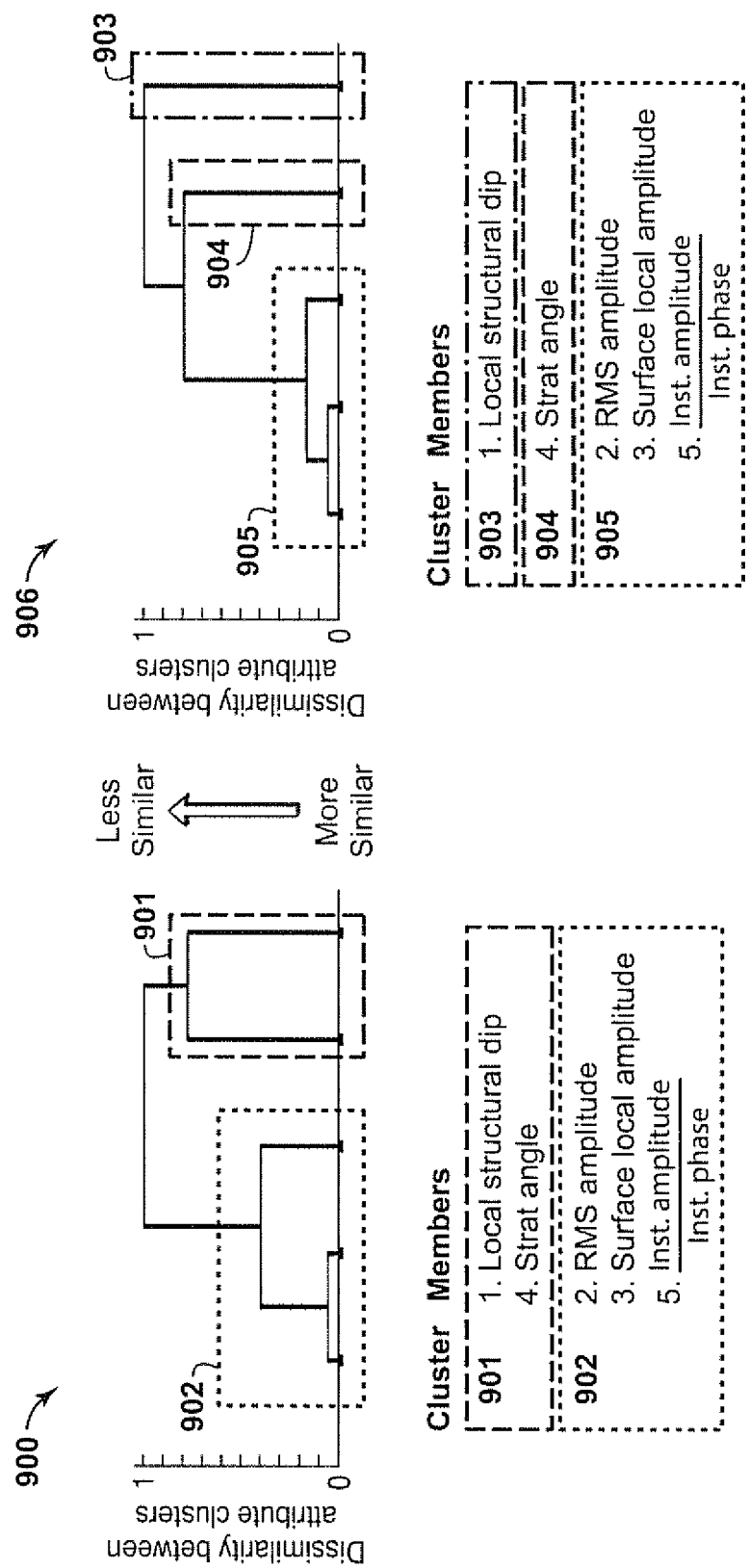
FIG. 9 is an exemplary single-link hierarchical dendogram.

("Computational Method of Feature Selection", edited by Huan Liu and Horoshi Motoda). These include principal component analysis, factor analysis, projection pursuit, decision trees, random forests, and single-link hierarchical dendograms (see Matlab's linkage and dendogram functions, which was applied in the example below (see FIG. 9)). FIG. 9 shows two attribute clusters (amplitude 902 and geometric clusters 901) for an example flooding surface segment 900, and three attribute clusters (amplitude 905, geometric 904, and dip 903 related clusters) from an example sequence boundary segment 906. Final selected features will utilize a subset of the attributes originally extracted for the test surfaces. Only the attributes used in the training features need be extracted for the unclassified surfaces.

Cross-validation should be part of computing and selecting the surface features (step 404) in order to estimate how accurately the model will work on unlabeled surfaces, prune and select features, but it is not required. K-fold cross validation and leave-one-out cross validation are two ways this could be done. Segment classes can be eliminated, merged, or increased based on based on cross-validation.

Next in FIG. 4 step 405, the segment patterns for the training surfaces are calculated. Segment label vectors are calculated from the segment labels. These vectors represent segment patterns, including occurrence, frequency and order, for particular surface classes. One way to calculate occurrence is to compute conditional probability values that define the likelihood that a given training-set segment class is found within a given surface class, SB or FS. This is calculated from the number of times a segment type occurs and the number of times a surface type occurs within the training set. The probability value that a segment belongs to

| Surface | Segment Start | Segment Stop | Merged Label | Merged Label Value | Above Horizon Label | Below Horizon Label | Above Horizon Label Value | Below Horizon Label Value |
|---|---|---|---|---|---|---|---|---|
| SB | | | | | | | | |
| CSB_2 | 53 | 765 | Conformable | 14 | p | p | 4 | 4 |
| CSB_2 | 765 | 1010 | Onlap above, Parallel below | 10 | o | p | 3 | 4 |
| CSB_2 | 1010 | 1180 | Onlap above, Truncation below | 12 | o | tr | 3 | 6 |
| TFS | | | | | | | | |
| CTS_3 | 375 | 605 | Conformable | 14 | p | p | 4 | 4 |
| CTS_3 | 605 | 825 | Downlap above, Parallel below | 6 | d | p | 2 | 4 |
| CTS_3 | 825 | 1235 | Conformable | 14 | p | p | 4 | 4 |
| MFS | | | | | | | | |
| MFS_2 | 360 | 595 | Conformable | 14 | p | p | 4 | 4 |
| MFS_2 | 595 | 715 | Downlap above, Parallel below | 6 | d | p | 2 | 4 |
| MFS_2 | 715 | 1450 | Conformable | 14 | p | p | 4 | 4 |

Next, as shown in FIG. 4 step 404, features are computed and selected for the classification model. Feature selection involves the analysis and selection of a subset of the attributes that contribute most significantly to the correct classification of a surface and to eliminate attributes that are redundant or less significant. This is recommended because it is increasingly hard to obtain a robust classification with an increasing number of attributes, and a disproportionate larger set of learning examples would be required, which would impose a heavier burden on the interpreter. This phenomenon is known in the machine learning literature as the "curse of dimensionality".

There are a number of methods in the machine learning literature that can be used to reduce the number of attributes a surface class, SB or FS, is assigned to each labeled test segment. The beliefs that each segment of the test surface belongs to a particular surface class are transformed into pignistic probabilities (Smets and Kennes, 1994). Concurrent with the proximity calculation, a conditional probability value is calculated that defines the likelihood that a given training-set segment class is found within a given surface class, SB or FS. This is calculated from the number of times a segment type occurs and the number of times a surface type occurs within the training set. The probability value that a segment belongs to a surface class, SB or FS, is assigned to each labeled test segment. The belief that the test surface belongs to a surface class is calculated, using the Dempster- Shafer combination rule, from the combined set of segment probability values assigned to the test surface. Using the pignistic probabilities computed for each segment, one can compute the probability that the unlabeled surface belongs to either the SB or FS surface class.

The classification model can be learned implicitly from the input labeled training surfaces, as in K-nearest neighbors classifiers (a method that classifies objects based on closest training examples in the feature space). This can be used to perform step 405. The K-nearest neighbor classifier assigns segment x to a particular class based on majority vote among the classes of k nearest training segments to segment x. Learning a classification model implicitly means that no optimization/learning takes place per se. An implicitly learned classifier is defined by the set of training data points and an algorithm which uses that data to make a classification on a new datum. Hence, this implicit learning is simply the process of gathering the training data, from which classifications are made. For example, a K-nearest neighbor classifier is implicit because there isn't really anything to learn per se and using the classifier to make a classification involves (the algorithm of) measuring the distance of the datum under evaluation to all of the training data and assigning the majority label of the K nearest neighbors. In contrast, learning, say, a neural network is explicit because something actually needs to be done with the training data which results in learning the parameters of the neural net that set the classifier.

Table 2 shows example label patterns for a sequence boundary and a flooding surface in a particular dataset. Somewhat different patterns would be recorded for other surfaces.

| Surface Class Label | Segment Number | Segment Label Above/Below | Segment Label Value |
|---|---|---|---|
| Sequence Boundary B | 1 | Conformable/Conformable | 1 |
| | 2 | Onlap/Toplap | 3 |
| | 3 | Conformable/Conformable | 1 |
| | 4 | Downlap&Onlap/Parallel | 0 |
| | 5 | Conformable/Conformable | 1 |
| | 6 | Chaotic/Chaotic | 6 |
| Flooding Surface C | 1 | Conformable/Conformable | 1 |
| | 2 | Chaotic/Truncation | 7 |
| | 3 | Conformable | 1 |
| | 4 | Chaotic/Truncation | 7 |
| | 5 | Conformable | 1 |
| | 6 | Chaotic/Truncation | 7 |

Classification and Confidence Calculations for Unclassified Surface(s)

Next, as is shown in FIG. 3, steps 304 and 305, one or more unclassified surfaces and attributes extracted from them are input to the classifier (step 306). As shown in FIG. 5, there can be seven steps in this process. First, as shown in FIG. 5, step 501, the unclassified surface is input. This is an interpreted or previously identified seismic surface or seismic surface patch. As discussed above, this method is aimed primarily at automatically obtained stacks of surfaces or surface patches, where the interpretation has not yet been subject to geologic understanding. However, the method can be applied to any single or set of surfaces, in 2D or 3D seismic data, interpreted using any methodology.

Next, as shown in FIG. 5, step 502, the surface is segmented. This could be done any number of ways, including evenly spaced segmentation. Surfaces could be segmented into parts of equal size (i.e., length or area), say representing patches 300 m long in 2D data, or 90 km$^2$ in 3D data. Alternatively, segments can be of unequal sizes. Segmentation can be done based on automatic partitioning by unsupervised classification based on one or more extracted attributes. Large segments may be formed where there is little to no variability in the key attributes characterizing the surface, and smaller segments where variability is present. This optional alternative is illustrated with the dashed line in FIG. 5 between step 503 and step 502.

Next, as shown in FIG. 5, step 503, seismic attributes are extracted for the unclassified surface and input to the classifier. This will normally represent only those attributes used in the training features and excluding those that were eliminated by redundancy analysis or other means.

Next, as shown in FIG. 5, step 504, surface feature(s) are computed. In some cases attributes calculated in step 503 may be combined, reducing the number of features in the classification matrix.

Next, as in FIG. 5, step 505, each surface segment is classified. Alternatively or in addition, the system may report the confidence of that classification or a degree of likelihood of each potential classification outcome. One classification approach involves comparing the seismic attributes from a test segment to the seismic attributes of the training-set segments. The segment is labeled with the segment type that has the maximum combined feature similarity. This is a form of an evidential nearest neighbor classifier. Of course, any other method available to one knowledgeable in the art could potentially be used.

Another classification approach is to use a generalization of Bayesian probability theory called Transferable Belief Model (TBM), which is used to represent and combine measures of belief in evidence bearing on a hypothesis, which in this case can be the hypothesis that a segment belongs to a segment type, or that an unlabeled surface belongs to a surface type. (Smets and Kennes, 1994; Smets and Ristic, 2004). This model is more flexible than classic Bayesian probability theory when knowledge is incomplete (missing attributes, segments) and when dealing with uncertainty, ignorance and conflicting evidence (SB and FS can both have conformable segments). Reported confidence is the TBM combined similarity value. Using this method, a proximity value is calculated to compare the seismic attributes from a test segment to the seismic attributes of the training-set segments. This can be done by evaluating the vector representing the test segment seismic attribute and the vectors representing each training-set segment using the dynamic time warping algorithm (DTW) The set of distance values and their similarity values (1-distance) from the DTW calculation are degrees of support for the simple support functions for the hypothesis that a feature belongs to a labeled segment. These degrees of support for each attribute are combined into simple, separable support functions representing the degree of belief that a test segment belongs to a labeled segment class, using the TBM. The beliefs that a training segment belongs to each training-segment class are transformed into pignistic probabilities (Smets and Kennes, 1994) and the test segment is labeled with the training-segment class that has the highest pignistic probability value.

If the classifier provides a measure of belief or probability confidence thresholds can be set for segments, and if the confidence level of a segment is below this threshold, the segment could be classified as not otherwise specified (NOS). If the measures are normalized, then we can require the confidence level to be significantly above the "random classification" baseline. (The "random classification" baseline is 1/N1/N, where NN is the number of classes. In the case of FS vs. SB classification that is 0.5.) The user can then specify that the confidence level must be significantly above the "random classification" baseline in an absolute sense, say greater than 0.7, or in a relative sense, say 20% above the "random classification" baseline, or 0.6.

Next, as shown in FIG. 5, step 506, similar, adjacent segments are merged using the classification result of each segment. The classification result can be used as a "hard" classification result, or "soft" classification if the classifier provides a measure of belief or probability in the segment belonging to a class versus the other. In the latter case, the classification output can be mapped to a conditional probability that the segment is a FS or SB by normalizing the soft classification values such that they sum to one for each segment. Those results can be used to guide the merging approach. An approach for merging segments involves the merging of any adjacent segments for which the classification agrees, replacing the individual segments with a single combined segment, and repeating the procedure until no further merging could occur. Alternatively, the results can be used to guide more complex merging schemes, possibly using correlations or patterns across several segments, effectively taking advantage of the hierarchical classification approach. Those complex schemes may require learning a second model that exploits those patterns to find a better merging.

Next, as shown in FIG. 5, step 507, the unclassified surface is classified and its confidence is reported. This is done by calculating the belief that the test surface belongs to a surface class. There are several ways to do this. The preferred embodiment is to use the Dempster-Shafer combination rule, from the combined set of segment probability values assigned to the test surface (in FIG. 4, step 405). The beliefs that each segment of the test surface belongs to a particular surface class are transformed into pignistic probabilities (Smets and Kennes, 1994). The pignistic probabilities are used to compute a probability that the unlabeled surface belongs to either the SB or FS surface class. The surface class with the highest probability is selected and assigned to the test surface. The classifier code can be modified to express the belief that the surface is not in our set of surfaces using a third class (NOS).

Concurrent with the proximity calculation, a conditional probability value is calculated that defines the likelihood that a given training-set segment class is found within a given surface class, SB or FS. This is calculated from the number of times a segment type occurs and the number of times a surface type occurs within the training set. The probability value that a segment belongs to a surface class, SB or FS, is assigned to each labeled test segment. The belief that the test surface belongs to a surface class is calculated, using the Dempster-Shafer combination rule, from the combined set of segment probability values assigned to the test surface. The beliefs that each segment of the test surface belongs to a particular surface class are transformed into pignistic probabilities [Smets and Kennes, 1994]. The pignistic probabilities are used to compute a probability that the unlabeled surface belongs to either the SB or FS surface class. The surface class with the highest probability is selected and assigned to the test surface. The classifier code is easily modifiable to also output the belief that the surface is not in the set of surfaces.

FIG. 3B, step 308, illustrates optional post-processing of surfaces that could be done to differentiate between the types of flooding surfaces (TFS, transgressive flooding surface, and MFS, maximum flooding surfaces). FSs represent relative rises in sea level. The TFS is the first (oldest) significant FS in a sequence. The MFS is the surface of deposition at the time the shoreline is at its maximum landward position (i.e., time of maximum transgression) and is the most continuous and youngest FS in a sequence. Each of these surfaces has implications for prediction of reservoir, source, seal, and other geologic properties of interest. Post-processing steps such as looking at pattern of surface labels based on patterns and positions of flooding surfaces between SB's could optionally be applied.

EXAMPLE

Figure 10:
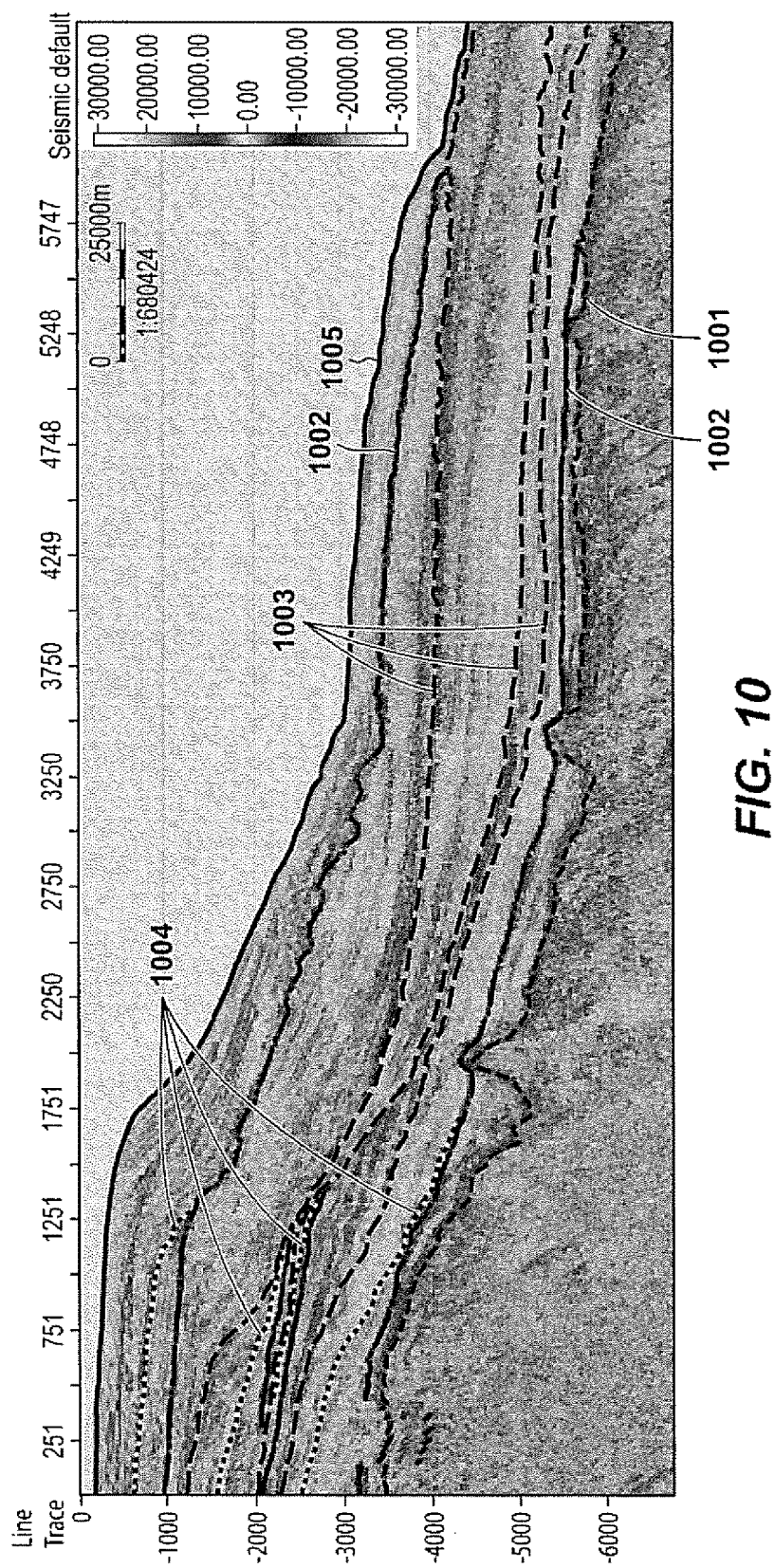
FIG. 10 is exemplary seismic data and horizons.

The following example describes implementing the present technological advancement to a 2D seismic line. Here, the process starts with three labeled sequence boundaries (SBs), and eight labeled flooding surfaces (FSs), four transgressive (TFSs) and four maximum flooding surfaces (MFSs), all adapted from Abreu et al., 2010 (FIG. 10).

In accordance with the above discussion, a training set was established to classify unclassified surfaces. As in FIG. 4, steps 401 and 402, previously interpreted surfaces were input and segmented. In this case, the manually interpreted surfaces are shown in FIG. 10. In FIG. 10, the y-axis is time in ms, and the x-axis is CDP number. The interpreted horizons are the Basement 1001, composite maximum flooding surfaces 1004, composite transgressive surfaces 1002, composite sequence boundaries 1003, and water bottom contact 1005. The surfaces were segmented by identifying the CDP endpoints of continuous segments of terminations (onlap, downlap, toplap and truncation) and reflection character (parallel and chaotic). The segments were labeled with a segment label reflecting the seismic character above and below the surface. An example of segmentation and labeling for one SB, one TFS, and one MFS are shown in Table 1.

Next, as in FIG. 4, step 403, seismic attributes were extracted at, above and below the labeled horizons. For the most part, the seismic attributes used in this study are commonly available in commercial software and commonly used to identify seismic terminations or seismic facies. They included several horizon local attributes, including amplitude and local structural dip, and several horizon-local attributes extracted 20 ms above and below the horizon, where the geometry of adjacent surfaces is better expressed, including amplitude, local structural dip, and chaos. Time-to-minimum amplitude and time-to-maximum amplitude were extracted over windows 10 to 40 ms above and below horizons, which can produce sawtooth pattern in regions with terminations.

Next, as in FIG. 4, step 404, the set of classification features was selected. Single-link hierarchical dendograms were calculated and plotted from all of the attributes extracted from each segment of each surface, where the x-axis represents each of the calculated attributes, and the y-axis represents the distance or dissimilarity between the attribute pairs, with increasing distance indicating increased dissimilarity. As illustrated in FIG. 9, these generally showed that attributes from FS segments grouped into two clusters, those based on amplitude and phase, and those based on geometries, and SB segments grouped into two to three clusters, those based on amplitude and phase, geometries, and dip, as illustrated in FIG. 9. Using this method, unique attribute groups to be identified, and duplicate information to be removed, was obtained in order to reduce the data size and/or dimensionality for more efficient classification. One attribute from each cluster of similar attributes was selected, reducing the matrix dimensionality.

Next, as in FIG. 4, step 405, the training surface segment patterns were calculated. Examples of these patterns are shown in Table 2.

Next, the classifier was tested using 'leave-one-out" validation. This method involved sequentially removing each surface, one-at-a-time, from the training set, to use as the unclassified surface, having the remaining surfaces form the training set, and evaluating the results. Each iteration followed the same steps used in classifying an unclassified surface, as illustrated in FIG. 5. As in FIG. 5, steps 501 and 502, a previously interpreted unclassified surface was identified and segmented. They were segmented into equal segments by number of CDP's. Next, as in FIG. 5, steps 503 and 504, seismic attributes were extracted and features were computed for the surface.

Next, as in FIG. 5, step 505, the segments were classified. This was done by repeatedly testing the hypothesis that a segment belonged to each segment type, using the Transferable Belief Model modification of Bayesian probability theory (Smets and Kennes, 1994; Smets and Ristic, 2004). Segments were labeled with the segment type that had the maximum TBM combined feature similarity, and confidence is the TBM combined similarity value. Comparison between the original labels and the classified labels for the segments in early experiments showed that 25% of the segments matched the character of the training segment above the surface, and 42% matched the character below the surface. Though not identical to interpreter labels, the segment classification labels appear to be geologically reasonable. This is supported by the fact that the surface classification system, on the whole, correctly identifies many surfaces, despite mislabeling of some segments.

Figure 11:
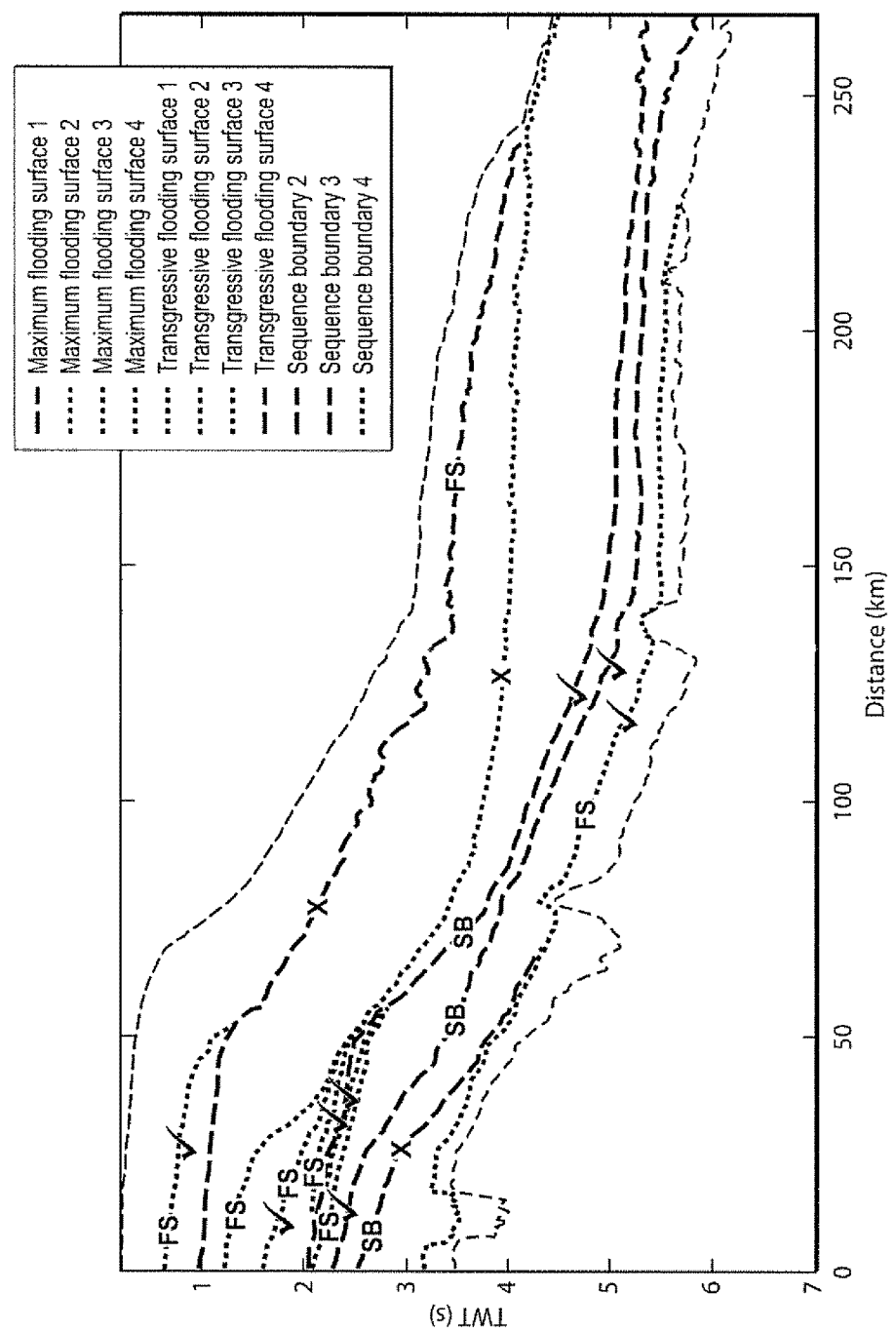
FIG. 11 is an example of correctly classified surfaces obtained from the present technological advancement.

Next, as in FIG. 5, step 506, adjacent like segments were merged. Finally, as in FIG. 5, step 506, each surface in the leave-one-out rotation was classified. FIG. 11 illustrates the results of the analysis. The classifier correctly identified two of three SBs (67%) and six of eight FSs (75%), wherein an X indicates an incorrect classification and a checkmark indicates a correct classification.

Computer Implementation

Figure 12:
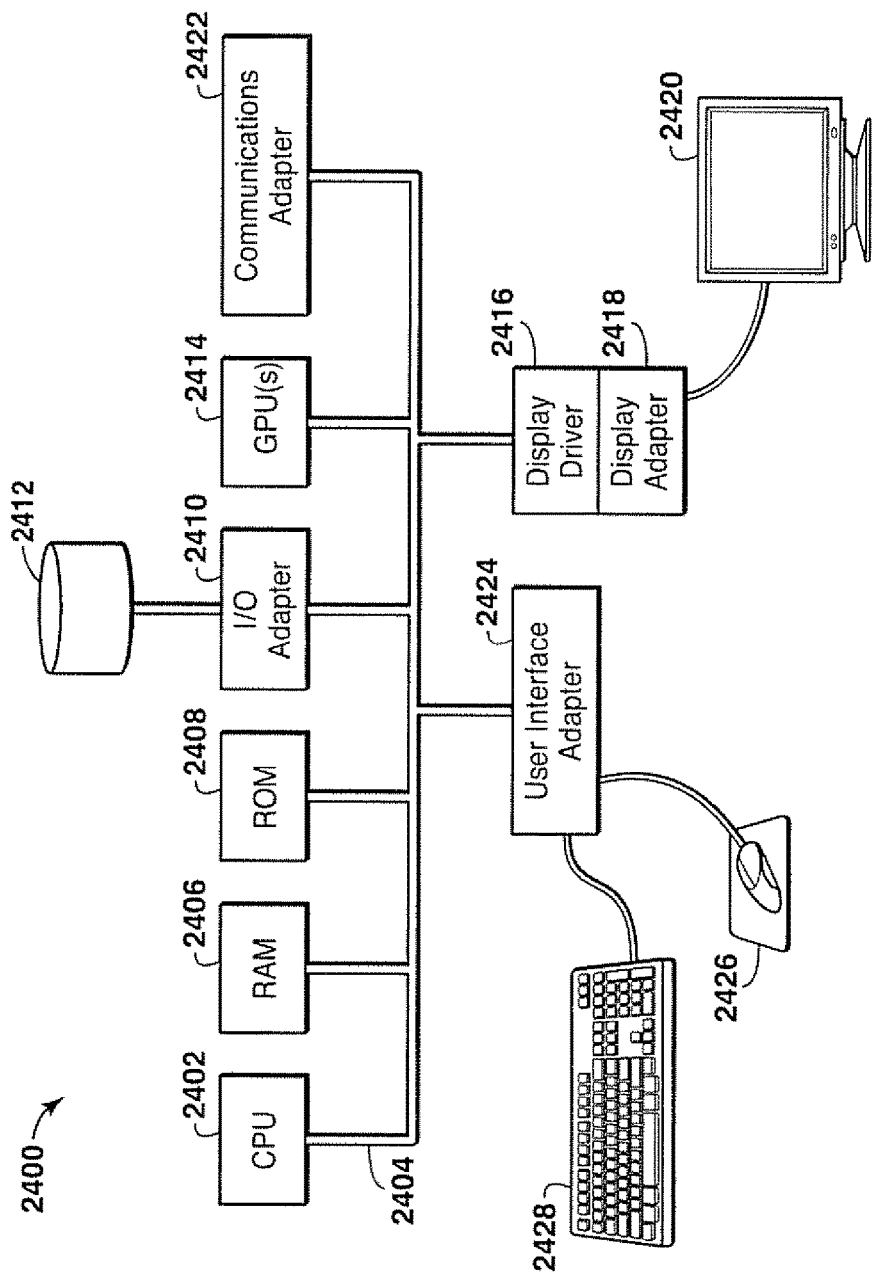
FIG. 12 is an exemplary computer system that can implement the present technological advancement.

FIG. 12 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 12, additional CPUs may be present. Moreover, the computer system 2400 may comprise a networked, multi-processor computer system that may include a hybrid parallel CPU/GPU system 2414. The CPU 2402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 2400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The foregoing application is directed to particular example embodiments of the present technological advancement. It will be apparent, however, to one skilled in the art, that many modifications and variations to the embodiments described herein are possible. All such modifications and variations are intended to be within the scope of the present invention, as defined in the appended claims. As will be obvious to the reader who works in the technical field, the present technological advancement is intended to be fully automated, or almost fully automated, using a computer programmed in accordance with the disclosures herein.

REFERENCES

The following documents are hereby incorporated by reference in their entirety:

Abreu, V. (1998), Geologic evolution of conjugate volcanic passive margins: Pelotas Basin (Brazil) and offshore Namibia (Africa); Implication for global sea-level changes, Rice University, Department of Earth Science, Houston, Tex., Ph.D. Thesis., 355 pp;

Abreu, V., J. E. Neal, K. M. Bohacs, J. L. Kalbas, (eds.) (2010), Sequence Stratigraphy of Siliciclastic Systems— The ExxonMobil Methodology, SEPM concepts in sedimentology and paleontology, no. 9, SEPM, Tulsa, Okla.;

Admasu, Fitsum, and Toennies, Klaus, 2004, Automatic method for correlating horizons across faults in 3D seismic data, IEEE Conference on Computer Vision and Pattern Recognition, 6 pages;

U.S. Pat. No. 7,248,539 to Borgos ("Extrema Classification");

Cartwright, J, R. Swart, B. Corner (2012), Conjugate margins of the South Atlantic: Namibia-Pelotas in *Regional Geology and Tectonics: Phanerozoic Passive Margins, Cratonic Basins and Global Tectonic Maps, Volume 1C*, Roberts, D. G. and A. W. Bally (eds.), Elsevier, Boston, ISBN 9780444563576, doi: 10.1016/j.bbr.2011.03.031;

Chopra, Santinder, and Marfurt, Kurt J., 2008, Emerging and future trends in seismic attributes, The Leading Edge, March 2008, p. 298-317;

Coward, M. P., E. G. Purdy, A. C. Ries, and D. G. Smith (1999), The distribution of petroleum reserves in basins of the South Atlantic margins, In: Cameron, N. R., Bate, R. H. and Clure, V. S. (eds) *The Oil and Gas Habitats of the South Atlantic*. Geological Society, London, Special Publications, 153, 101-131;

Davison, I. (1999), Tectonics and hydrocarbon distribution along the Brazilian South Atlantic margin, In: Cameron, N. R., Bate, R. H. and Clure, V. S. (eds) *The Oil and Gas Habitats of the South Atlantic*. Geological Society, London, Special Publications, 153, 133-151;

deGroot, Paul, and Qayyum, Farrukh, 2012, Attributes play important role in seismic interpretation, E&P v. 85, no. 10, pp. 31, 33-34, October 2012. (ISSN 1527-4063);

Gesbert, S, Van Hoek, T. Pickens, J., Van Rensbergen, P., 2009, 712st EAGE Balancing Global Resources/SPE EUROPEC Conference [Amsterdam 09] (Amsterdam, The Netherlands, 6/8-11/2009), Extended Abstracts 2009, (ISBN 978-90-73781-67-2), Paper No. V034, 5pp;

Gesbert, Stephane, and Van, Hoek tomas, CA2764705, 2010, Method for stratigraphic analysis of seismic data, WO20101426592A;

Hart, Bruce S., 2013, Whither seismic stratigraphy, Interpretation, Vol. 1., No. 1 (August 2013), p. SA3-SA20;

Imhof et al., 2011, WO2011/149609 A1;

Imhof, 2010, WO 2010/053618;

Imhof et al., U.S. Patent Application Publication No. 2010/0149917;

Imhof et al., 2009, Seismic horizon skeletonization, WO2009142872 A1;

James, 2007, "System and Method for Displaying Seismic Horizons with Attributes" (PCT Patent Application Publication No. WO 2007046107);

Keskes et al., 2004, U.S. Pat. No. 6,771,800 ("Method of Chrono-Stratigraphic Interpretation of A Seismic Cross Section Or Block");

May, S. R., West, B. P., WO 2002029445 A1;

Mohriak, W. U. and R. Fainstein (2012), Phanerozoic regional geology of the eastern Brazilian margin, in Regional Geology and Tectonics: Phanerozoic Passive Margins, Cratonic Basins and Global Tectonic Maps, Volume 1C, Roberts, D. G. and A. W. Bally (eds.), Elsevier, Boston, ISBN 9780444563576, doi: 10.1016/j.bbr.2011.03.031;

Monsen et al., "Geologic-process-controlled interpretation based on 3D Wheeler diagram generation," SEG 2007, EAGE 69$^{th}$ Conference & Exhibition—London, UK, 11-14 Jun. 2007, 5 pages;

U.S. Pat. No. 7,248,539 to Borgos;

Mitchum, R. M., P. R. Vail, and J. B. Sangree, Seismic stratigraphy and global changes of sea level, Part 6: Stratigraphic interpretation of seismic reflection patterns in depositional sequences, in C. E. Clayton, ed., Seismic stratigraphy—applications to hydrocarbon exploration: Tulsa, Okla., American Association of Petroleum Geologists Memoir 26, p. 63-81 (1977);

Pal N. R. and S. Ghosh, (2001) Some classification algorithms integrating Dempster-Shafer theory of evidence with the rank nearest neighbor rules;

Pauget, Fabien, Lacaze, Sebastien, Valding, Thomas, 2010, Method for geologically modeling seismic data by trace correlation, WO 2010/067020 A2;

Pedersen, Stein Inge, 2002, Extracting Features from an Image by Automatic Selection of Pixels Associated with a Desired Feature, GB Patent No. 2,375,448 (A);

F. C. Ponte, H. E. Asmus (1976) The Brazilian marginal basins: current state of knowledge. *An. Acad. Brasil. Ciěnc.*, 48, pp. 239-251 (Suppl.);

Posamentier, H. W., Allen, G. P., 1999. Siliciclastic sequence stratigraphy: concepts and applications. SEPM Concepts in Sedimentology and Paleontology no. 7, p. 210;

Posamentier, H. W., Davies, R. J., Cartwright, J. A., and Wood, L., 2007, Seismic geomorphology—an overview, from Davies, R. J., Posamentier, H. W., Wood., L. J., and Cartwright., J. A., (eds.) Seismic Geomorpohology: Applications to Hydrocarbon Exploration and Production, Geological society, London, Special Publications, 277, 1-14;

Randen, T., E. Monsen, C. Signer, A. Abrahmson, J. O. Hansen, T. Saeter, J. Schlaf, L. Sonneland, (2000) Three-dimensional texture attributes for seismic data analysis. SEG Expanded Abstracts;

Rogova, G. L. M. I. Bursik, and S. Hanson-Hedgecock, (2009), Intelligent system for interpreting the pattern of volcanic eruptions. ISIF Journal of Advances in Information Fusion, available at isiforg;

Roy, A., M. Matos, K. J. Marfurt, 2010, Automatic Seismic Facies Classification with Kohonen Self Organizing Maps-a Tutorial, Geohorizons, vol. 15, no. 2, p. 6-14;

Smets P. and R. Kennes (1994) The transferable belief model. Artificial Intelligence, 66(2), 191-234;

Smets P. and B. Ristic, (2004) Kalman Filter and Joint Tracking and classification based on belief functions in the TBM framework, Information Fusion, 8, 1, (January 2007), 16-27;

Stark, T., 1996, Surface slice generation and interpretation: A review. The Leading Edge, 15(7), p. 818-819. doi: 10.1190/1.1437369;

Stark, Tracy J., 2004, Relative geologic time (age) volumes—relating every seismic sample to a geologically reasonable horizon, The Leading Edge, p. 928-932;

Stark, Tracy Joseph, 2005, U.S. Pat. No. 6,850,845 B2, system for multi-dimensional data analysis;

Stark, System for multidimensional data analysis, U.S. Patent application 2003/0018436;

Stark, System for information extraction from geologic time volumes, U.S. Patent application 2003/0023383;

Vail, P. R., R. M. Mitchum, R. G. Todd, J. M. Widmier, S. Thompson, J. B. Sangree, J. N. Bubb, W. G. Hatfelid, 1977, Seismic stratigraphy and global changes of sea level, in C. E. Clayton, ed., Seismic stratigraphy—applications to hydrocarbon exploration: Tulsa, Okla., American Association of Petroleum Geologists Memoir 26, p. 63-81;

Van Wagoner, J. C., H. W. Posamentier, R. M. Mitchum, P. R. Vail, J. F. Sarg, T. S. Loutit, and J. Hardenbol, 1988, An overview of the fundamentals of sequence stratigraphy and key definitions. In C. K. Wilgus, B. S. Hastings, C. G. St. C. Kendall, H. W. Posamentier, C. A. Ross, J. C. Van Wagoner, eds., Sea-level changes: an integrated approach. Society of Economic Paleontologists and Mineralogists Special Publication No. 42, p. 39-45;

Zeng, Hongliu, Hentz, Tucker F., Wood, Lesli J., 2001, Stratal slicing of Miocene-Pliocene sediments in Vermilion Block 50-Tiger Shoal Area, offshore Louisiana, The Leading Edge, 2001, Vol. 20, No. 4, 408-418;

Viswanathan U.S. Pat. No. 5,570,106, Issued 1996;

West, Brian P., May, Steve R., Eastwood, John E., Rossen, Christine, Interactive Seismic Facies Classification Using Textural Attributes and Neutral Networks, Leading Edge (Tulsa, Okla.) (October 2002), Volume 21, Number 10, pp. 1042-1049;

Wheeler, H. F., 1958, Time-stratigraphy: Bulletin, 42, 1047-1063; and

U.S. Pat. No. 6,847,895.

What is claimed is:

1. A method to classify one or more seismic surfaces or surface patches based on measurements from seismic data, comprising:

obtaining, by a computer, a training set including a plurality of previously obtained and labeled seismic surfaces or surface patches and one or more training seismic attributes measured or calculated at, above, and/or below the seismic surfaces;

obtaining, by the computer, one or more unclassified seismic surfaces or surface patches and one or more seismic attributes measured or calculated at, above, and/or below the unclassified seismic surfaces, wherein the one or more seismic attributes includes a single boundary measure of attribute contrast above and below a seismic surface or surface patch of the plurality of previously obtained and labeled seismic surfaces or surface patches, such that the single boundary measure represents the collapsing of stratigraphically diagnostic seismic facies information into said single boundary measure;

learning, by the computer, a classification model from the previously obtained and labeled seismic surfaces or surface patches and the one or more training seismic attributes, wherein the classification model is based at least in part on the single boundary measure of attribute contrast; and classifying, by the computer, the unclassified seismic surfaces or surface patches based on the application of the classification model to the unclassified seismic surfaces or surface patches.

2. The method of claim 1, wherein the method further includes quantifying a degree of confidence in a classification of the unclassified seismic surfaces or surface patches.

3. The method of claim 1, wherein the classifying includes labeling the unclassified seismic surfaces or surface patches with a label that differentiates between stratigraphic classes.

4. The method of claim 3, wherein the labeling differentiates between sequence boundaries and flooding surfaces.

5. The method of claim 3, wherein the classifying uses a relationship between surfaces to further differentiate flooding surfaces into maximum flooding surfaces or transgressive flooding surfaces.

6. The method of claim 1, wherein the learning includes learning the classification model implicitly from the plurality of previously obtained and labeled seismic surfaces or surface patches and the one or more training seismic attributes.

7. The method of claim 1, wherein the single boundary measure is derived from one or more of the following attributes above versus below the seismic surface or surface patch: amplitude; dip; frequency; chaos; attributes that highlight thinning, pinchouts, and/or terminations; and attributes that highlight surface position, extent, continuity, and curvature.

8. The method of claim 1, wherein the classifying includes eliminating redundant attributes from amongst the one or more seismic attributes measured or calculated at, above, and/or below the unclassified seismic surfaces using a single-link hierarchical dendogram.

9. The method of claim 1, wherein the classifying is by hard assignment.

10. The method of claim 1, wherein the classifying is by soft assignment.

11. The method of claim 1, wherein the classifying includes segmenting the one or more unclassified seismic surfaces or surface patches.

12. The method of claim 1, wherein the classifying includes individually classifying segments of the one or more unclassified seismic surfaces or surface patches.

13. The method of claim 11, wherein the segmenting results in approximately equal segment sizes.

14. The method of claim 11, wherein the segmenting includes using the one or more seismic attributes to determine segment size, wherein at least one segment has a different size than another segment.

15. The method of claim 2, further comprising differentiating between different flooding surfaces of the classification of the unclassified seismic surfaces or surface patches.

16. The method of claim 1, further comprising using the classification of the unclassified seismic surfaces or surface patches to manage the production of hydrocarbons.

17. The method of claim 1, wherein the classification model is learned in an incompletely labeled training dataset.

18. The method of claim 1, wherein the classifying includes classifying surfaces above but not below AVO.

* * * * *